(12) United States Patent
Nakajima et al.

(10) Patent No.: US 10,459,681 B2
(45) Date of Patent: Oct. 29, 2019

(54) INFORMATION PROCESSING APPARATUS, INFORMATION PROCESSING METHOD, AND STORAGE MEDIUM

(71) Applicant: FUJITSU LIMITED, Kawasaki-shi, Kanagawa (JP)

(72) Inventors: Kenji Nakajima, Machida (JP); Katsuhiko Akiyama, Kawasaki (JP); Bin Chen, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 16/006,205

(22) Filed: Jun. 12, 2018

(65) Prior Publication Data

US 2018/0373486 A1 Dec. 27, 2018

(30) Foreign Application Priority Data

Jun. 23, 2017 (JP) .................................. 2017-123031

(51) Int. Cl.
*G06F 3/14* (2006.01)
*H04L 29/06* (2006.01)
*G09G 5/14* (2006.01)
*H04N 7/15* (2006.01)

(52) U.S. Cl.
CPC ............. *G06F 3/1462* (2013.01); *G09G 5/14* (2013.01); *H04L 65/1089* (2013.01); *H04L 65/403* (2013.01); *H04L 65/4015* (2013.01); *G09G 2340/12* (2013.01); *H04N 7/15* (2013.01)

(58) Field of Classification Search
CPC .. G06F 3/1462; G06F 3/1454; G06F 3/04883; G06F 3/04842; G06F 3/04812; G06F 3/011; G06F 17/50; G06F 2217/04; H04L 65/4015; H04L 12/1818; H04L 65/403; H04L 12/1822; A63F 13/35; A63F 13/52
See application file for complete search history.

(56) References Cited

U.S. PATENT DOCUMENTS

2008/0068290 A1* 3/2008 Muklashy ............. G06F 3/1423
345/2.1
2012/0327106 A1* 12/2012 Won .................... G06F 3/04883
345/619
2016/0210101 A1 7/2016 Moriwaki et al.

FOREIGN PATENT DOCUMENTS

| JP | 2013-065125 | 4/2013 |
|---|---|---|
| JP | 2015-090607 | 5/2015 |
| JP | 2016-134846 | 7/2016 |

* cited by examiner

*Primary Examiner* — Sanjiv D. Patel
(74) *Attorney, Agent, or Firm* — Fujitsu Patent Center

(57) ABSTRACT

An information processing apparatus includes a display configured to include a first screen; and a processor coupled to the display, configured to: in a case where a part of a plurality of objects included in contents to be shared by a plurality of information processing apparatuses is out of an area of a first screen of the display, receive a notification which indicates that an operation for a first object which is out of the area of the first screen is executed by another information processing apparatus, and display an image which indicates existence of the first object and a type of the operation at a position on the first screen, the position being calculated based on a position of the first object.

12 Claims, 24 Drawing Sheets

BASE B

BASE A

FIG. 7

| OBJECT NAME | POSITIONAL INFORMATION | | OPERATION TYPE | OPERATED DATE AND TIME | FLAG |
|---|---|---|---|---|---|
| | UPPER LEFT COORDINATES | LOWER RIGHT COORDINATES | | | |
| a | (a1,a2) | (a3,a4) | | | 0 |
| b | (b1,b2) | (b3,b4) | | | 0 |
| c | (c1,c2) | (c3,c4) | | | 0 |
| d | (d1,d2) | (d3,d4) | | | 0 |
| e | (e1,e2) | (e3,e4) | GENERATION | 2017/2/14 09:15 | 1 |
| f | (f1,f2) | (f3,f4) | | | 1 |
| g | (g1,g2) | (g3,g4) | GENERATION | 2017/2/14 09:06 | 1 |
| h | (h1,h2) | (h3,h4) | | | 1 |
| i | (i1,i2) | (i3,i4) | MOVEMENT | 2017/2/14 09:24 | 1 |

| DISPLAY RANGE || UPDATED DATE AND TIME |
|---|---|---|
| UPPER LEFT COORDINATES | LOWER RIGHT COORDINATES | |
| (A1,A2) | (A3,A4) | 2017/2/14, 9:00 |

| BASE NAME | DISPLAY RANGE | | UPDATED DATE AND TIME |
|---|---|---|---|
| | UPPER LEFT COORDINATES | LOWER RIGHT COORDINATES | |
| B | (B1,B2) | (B3,B4) | 2017/2/14, 9:02 |
| C | (C1,C2) | (C3,C4) | 2017/2/14, 9:01 |

122

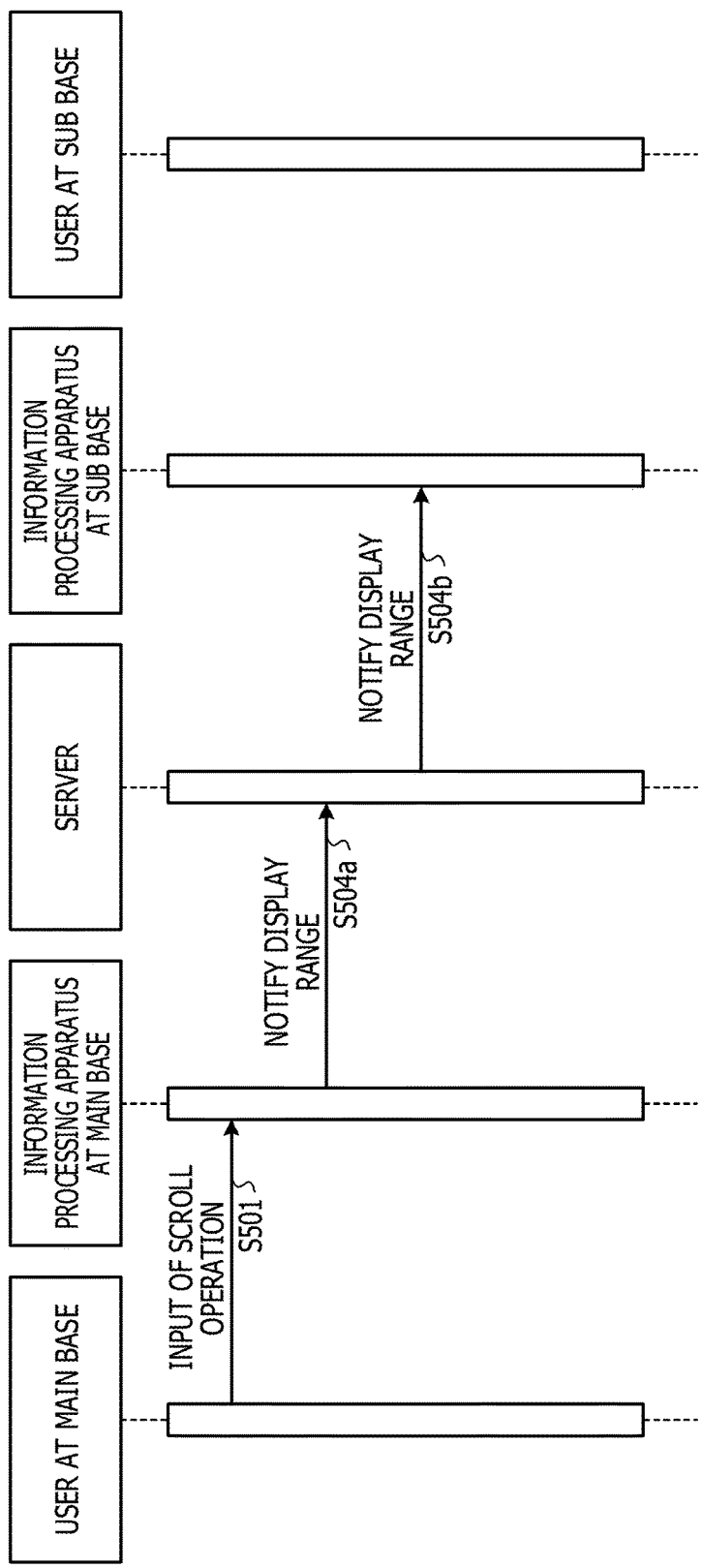

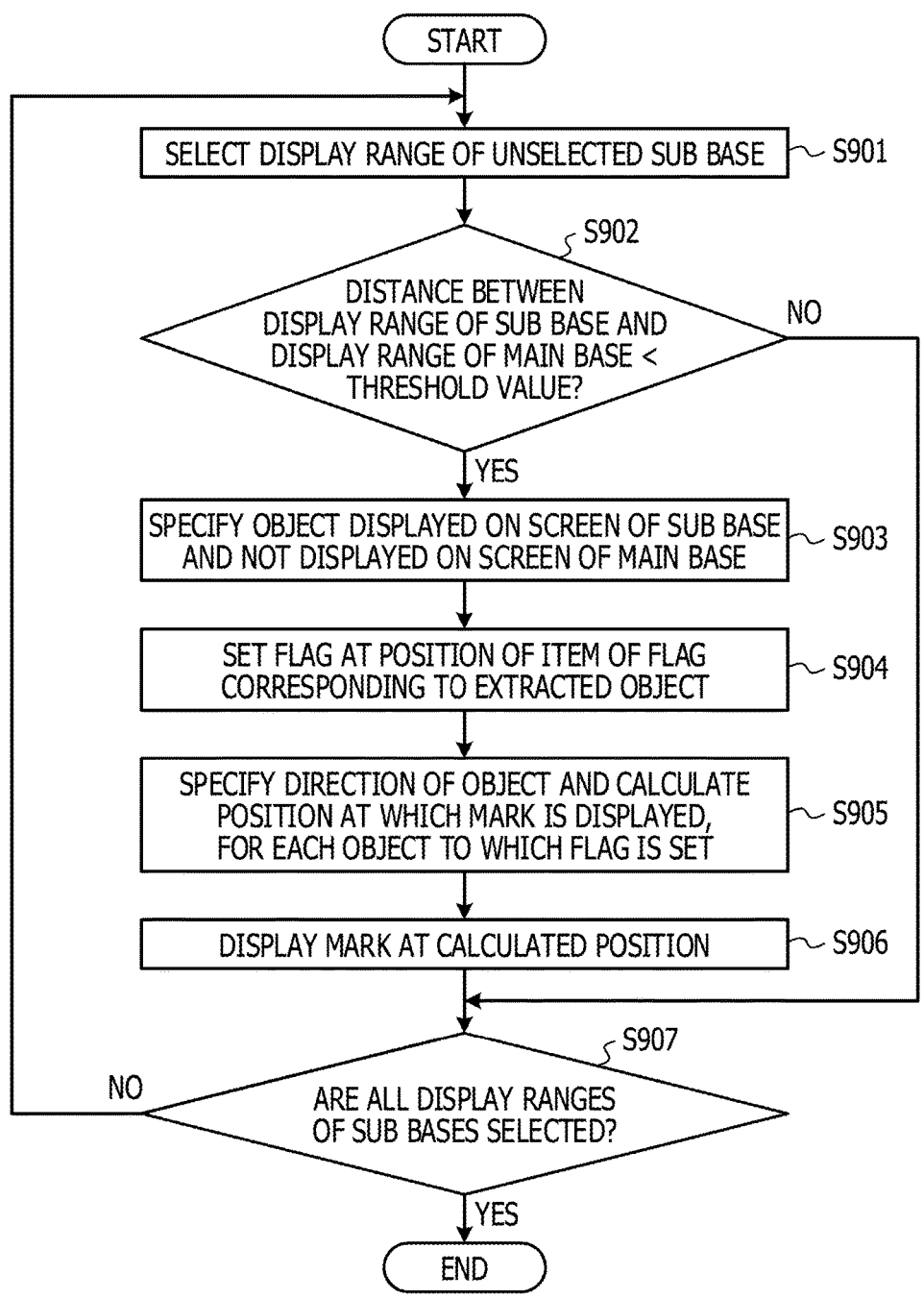

INFORMATION PROCESSING APPARATUS, INFORMATION PROCESSING METHOD, AND STORAGE MEDIUM

CROSS-REFERENCE TO RELATED APPLICATION

This application is based upon and claims the benefit of priority of the prior Japanese Patent Application No. 2017-123031, filed on Jun. 23, 2017, the entire contents of which are incorporated herein by reference.

FIELD

The embodiments discussed herein are related to an information processing apparatus, an information processing method, and a storage medium.

BACKGROUND

Recently, a conference is held while connecting a plurality of bases to a network, and the conference is called an electronic conference. In the electronic conference, a conference can be held among users at the respective bases while displaying images (content) common to screens of the information processing apparatuses provided in each base. For example, it is possible to hold the conference between the plurality of bases while displaying attaching an image such as an electronic tag or a photograph on the content, or displaying characters written on the content by considering the screen as electronic imitation paper. Japanese Laid-open Patent Publication No. 2015-090607, Japanese Laid-open Patent Publication No. 2016-134846, and Japanese Laid-open Patent Publication No. 2013-65125 are disclosed as related arts.

While the electronic conference is being held, common content is displayed on the screen of the information processing apparatus at each base, and information is shared between the bases. However, since the screens of the information processing apparatuses at the respective bases are often not the same in a screen size and resolution, and are controlled independently of each other, a state may occur in which a part of the content is not displayed on the screen of a certain information processing apparatus. Meanwhile, as the electronic conference progresses, the content is operated by one of the bases and is updated at any time. Accordingly, for example, in a case where a part of the content that is not displayed on the screen of the information processing apparatus at the main base is operated by the information processing apparatus at the sub base, the main base may not notice the operation. In consideration of the above, it is preferable that the sub base can grasp the content of the operation performed by one base with respect to the common content in real time so as to smoothly progress the electronic conference.

SUMMARY

According to an aspect of the invention, an information processing apparatus includes a display configured to include a first screen; and a processor coupled to the display, configured to: in a case where a part of a plurality of objects included in contents to be shared by a plurality of information processing apparatuses is out of an area of a first screen of the display, receive a notification which indicates that an operation for a first object which is out of the area of the first screen is executed by another information processing apparatus, and display an image which indicates existence of the first object and a type of the operation at a position on the first screen, the position being calculated based on a position of the first object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a content information table;

FIG. 9 is a diagram illustrating an example of a main base display range table;

FIG. 10 is a diagram illustrating an example of a sub base display range table;

FIG. 15 is a sequence diagram illustrating an example of processing performed in the system in a case where the scroll operation is performed on the screen of the information processing apparatus at the main base, according to the first embodiment;

FIG. 23 is a flowchart illustrating an example of mark display processing according to a third embodiment.

DESCRIPTION OF EMBODIMENTS

Hereinafter, embodiments of the present disclosure will be specifically described with reference to FIGS. 1 to 24.

First Embodiment

Hereinafter, a first embodiment will be described with reference to FIGS. 1 to 20.

Figure 1:
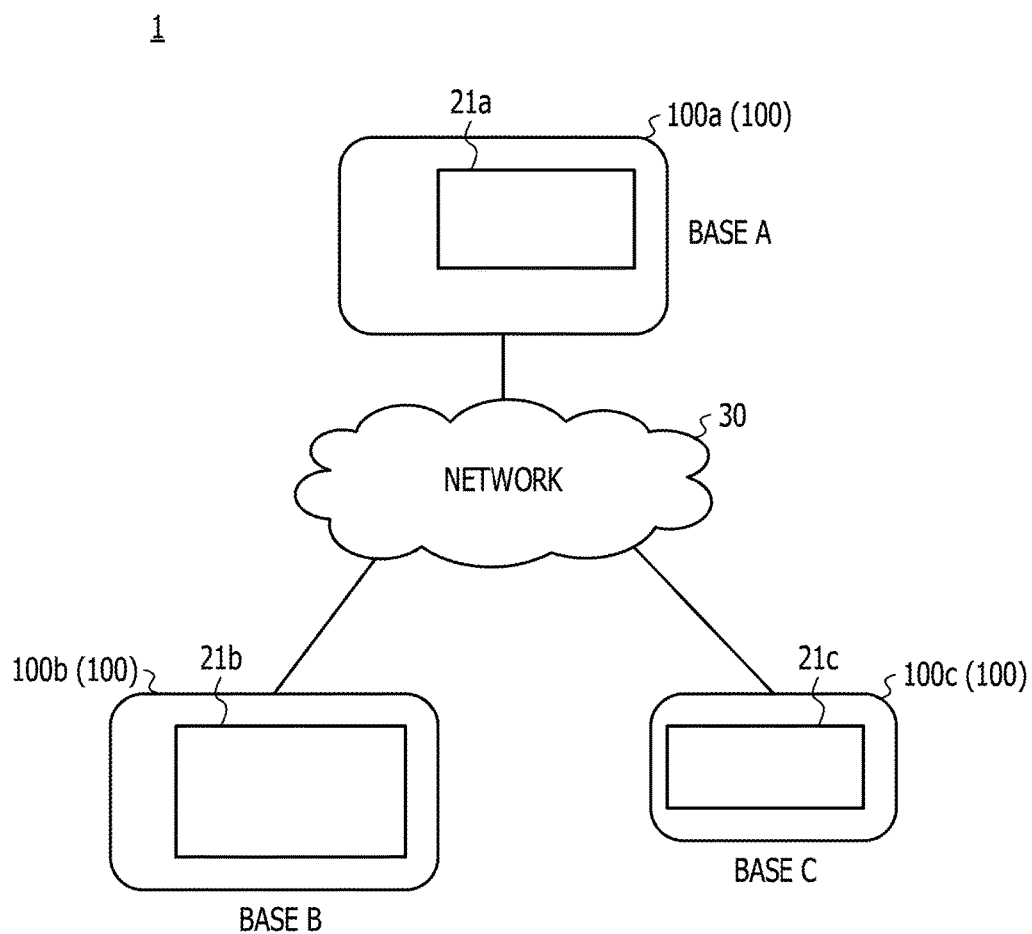
FIG. 1 is a diagram illustrating an example of a system according to a first embodiment.

FIG. 1 is a diagram illustrating an example of a system according to the first embodiment. As illustrated in FIG. 1, the system 1 includes an information processing apparatus 100a, an information processing apparatus 100b, and an information processing apparatus 100c. The information processing apparatuses 100a, 100b, and 100c are computers connected to each other so as to be able to communicate with each other via a network 30. The information processing apparatus 100a includes a screen 21a and is installed at a base A. The information processing apparatus 100b includes a screen 21b and is installed at a base B. The information processing apparatus 100c includes a screen 21c and is installed at a base C. In the information processing apparatuses 100a, 100b, and 100c, application software for referring to and editing content is installed. A server (not illustrated) that stores content to be referenced by each base and relays information being communicated between the bases may be connected to the network 30. Hereinafter, in a case where the information processing apparatuses 100a, 100b, and 100c are not intended to distinguish from each other, the information processing apparatuses 100 is collectively used therefor in some cases. In a case where the screens 21a, 21b and 21c are not intended to distinguish from each other, the screen 21 is collectively used therefor in some cases.

When an electronic conference is held between the base A, the base B, and the base C, the same content is displayed on the screen 21a, the screen 21b, and the screen 21c. The content contains a plurality of objects. The object is, for example, an image such as an electronic tag or a photograph, or an image such as a character or an illustration generated by a user performing a writing operation on the screen 21. By displaying the same content on the screen 21, the information processing apparatuses 100 at each base can perform the electronic conference while sharing information on the plurality of objects included in the content between the bases. Here, a problem that may occur when holding an electronic conference will be described.

For example, as illustrated in FIG. 1, the screens 21a, 21b, and 21c referred to by participants at each base in an electronic conference do not necessarily have the same size. Meanwhile, even if the sizes of the screens 21 at each base are the same, each base is not necessarily display the same range of content on each screen 21 by using the same magnification during the conference. During the conference, a display range of the content is altered appropriately and individually for each base, and a part of the content is enlarged to be displayed depending on the base, and thus, not all the objects in the content are displayed.

Figure 2:
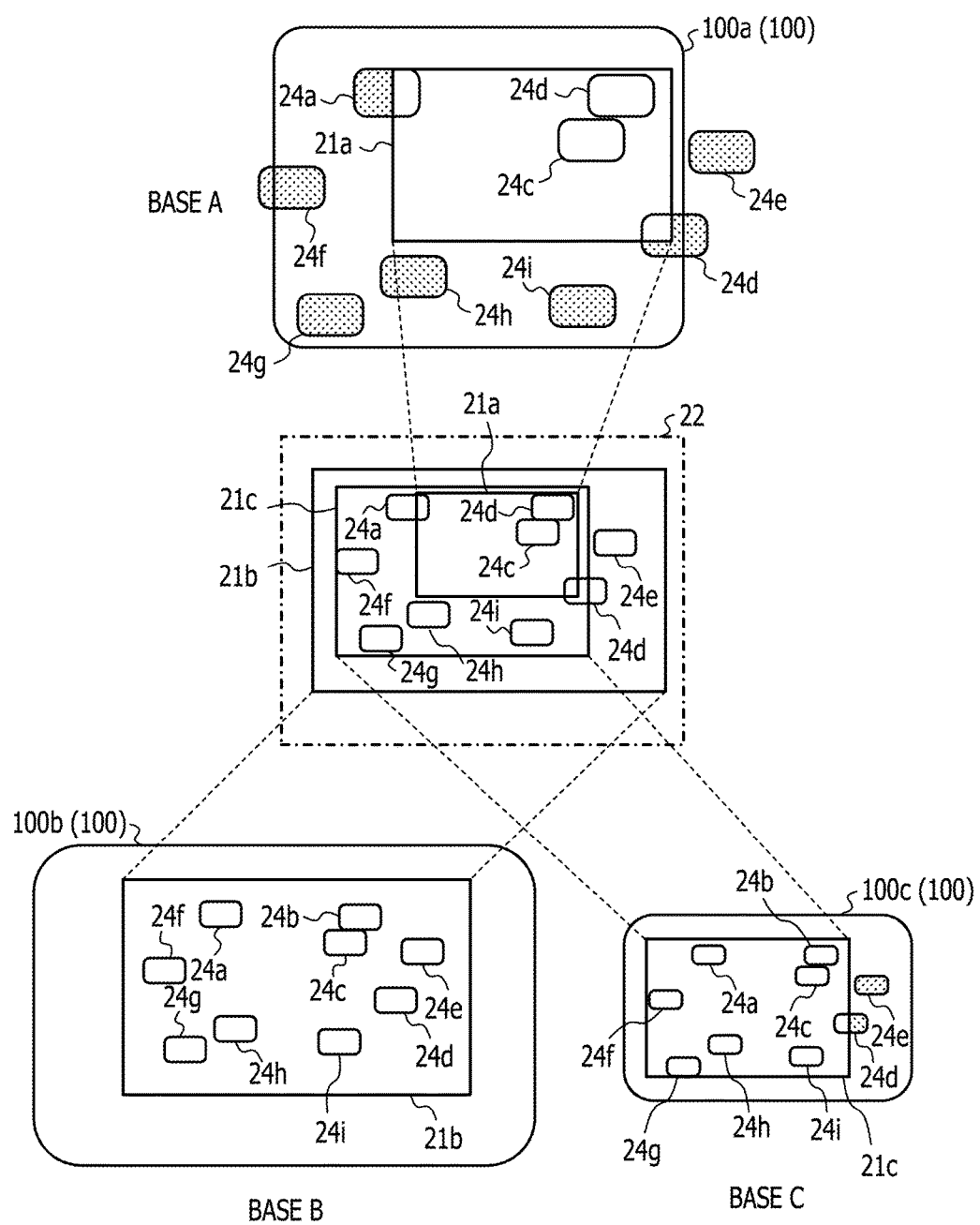
FIG. 2 is a diagram illustrating an example of a display state of content at each base.

FIG. 2 is a diagram illustrating an example of a display state of the content at each base. The content 22 illustrated in FIG. 2 is configured with nine objects 24a, 24b, 24c, 24d, 24e, 24f, 24g, 24h, and 24i illustrated as corner-rounded rectangles. Hereinafter, in a case where the objects are not intended to distinguish from each other, an object 24 is collectively used therefor in some cases. A middle drawing in FIG. 2 illustrates a positional relationship between the display ranges of the bases A, B, and C and the plurality of objects 24. In FIG. 2, a plain region not hatched in the object 24 indicates a region displayed on the screen 21. Meanwhile, a region hatched with a plurality of dots indicates a region not displayed on the screen 21.

Referring to the base B in FIG. 2, the entire objects 24a, 24b, 24c, 24d, 24e, 24f, 24g, 24h, and 24i are displayed on the screen 21b of the information processing apparatus 100b.

Meanwhile, referring to the base A, all the regions of the object 24b and the object 24c are displayed on the screen 21a of the information processing apparatus 100a. Partial regions of the object 24a and the object 24d are displayed on the screen 21a. However, the objects 24e, 24f, 24g, 24h, and 24i are not displayed on the screen 21a.

Meanwhile, referring to the base C, all the regions of the objects 24a, 24b, 24c, 24f, 24g, 24h, and 24i are displayed on the screen 21c of the information processing apparatus 100c. A part region of the object 24d is displayed on the screen 21c. However, the object 24e is not displayed on the screen 21c. As such, in the electronic conference, the type and number of the objects 24 displayed on the screens 21 may differ depending on the bases.

Figure 3A:
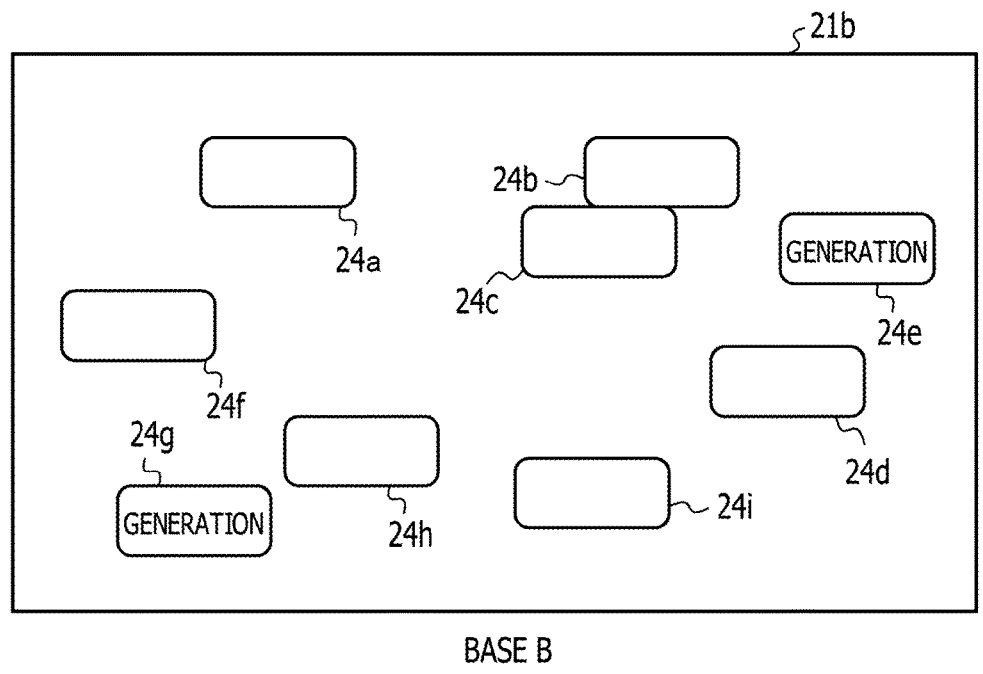
FIGS. 3A and 3B are diagrams illustrating a problem that can occur in a case where the system of FIG. 1 is used.
Figure 3B:
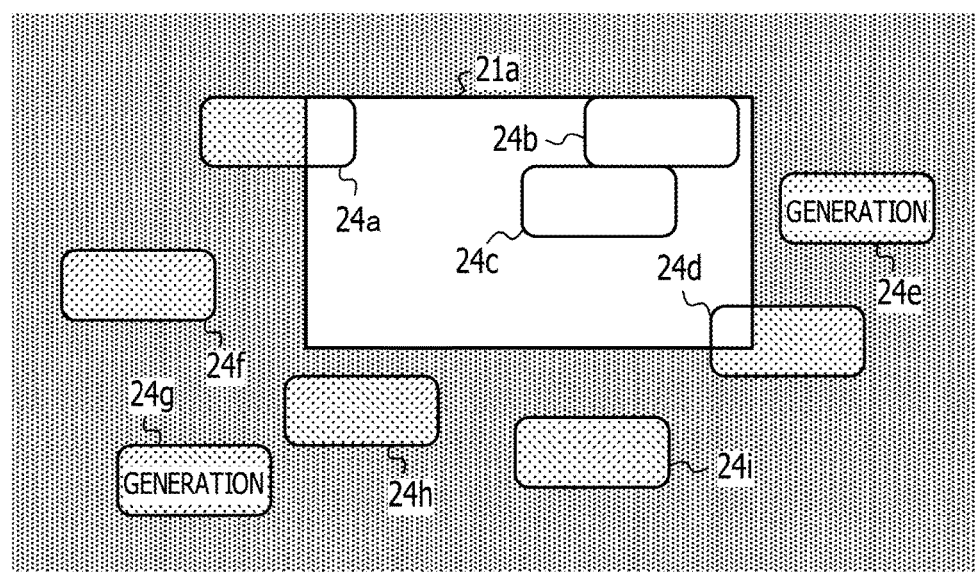

FIGS. 3A and 3B are diagrams illustrating a problem that may occur in a case where the system of FIG. 1 is used. FIG. 3A illustrates a display state of the content 22 at the base B. FIG. 3B illustrates a display state of the content 22 at the base A.

As illustrated in FIG. 3A, for example at the base B, it is assumed that a user of the information processing apparatus 100b newly generates the object 24g and the object 24e during the electronic conference. However, as illustrated in FIG. 3B, since the generated object 24g and the object 24e are placed outside (hatched region with slant lines) of the screen 21a at the base A, the generated objects are not displayed on the screen 21a at the base A. Accordingly, the user of the information processing apparatus 100a at the base A may not notice that the object 24g and the object 24e are generated, and a problem in which communication with the base B is not smoothly performed may occur. As described above, since the content 22 of the same display range is not necessarily displayed on the screen 21 by using the same magnification at each base, even if sizes of the screens 21 of the respective bases are the same, the same problem may occur. In view of this, it is preferable that a certain base can timely grasp operations performed by sub bases outside the region displayed on the screen 21.

Next, functional blocks of the information processing apparatus 100 will be described.

Figure 4:
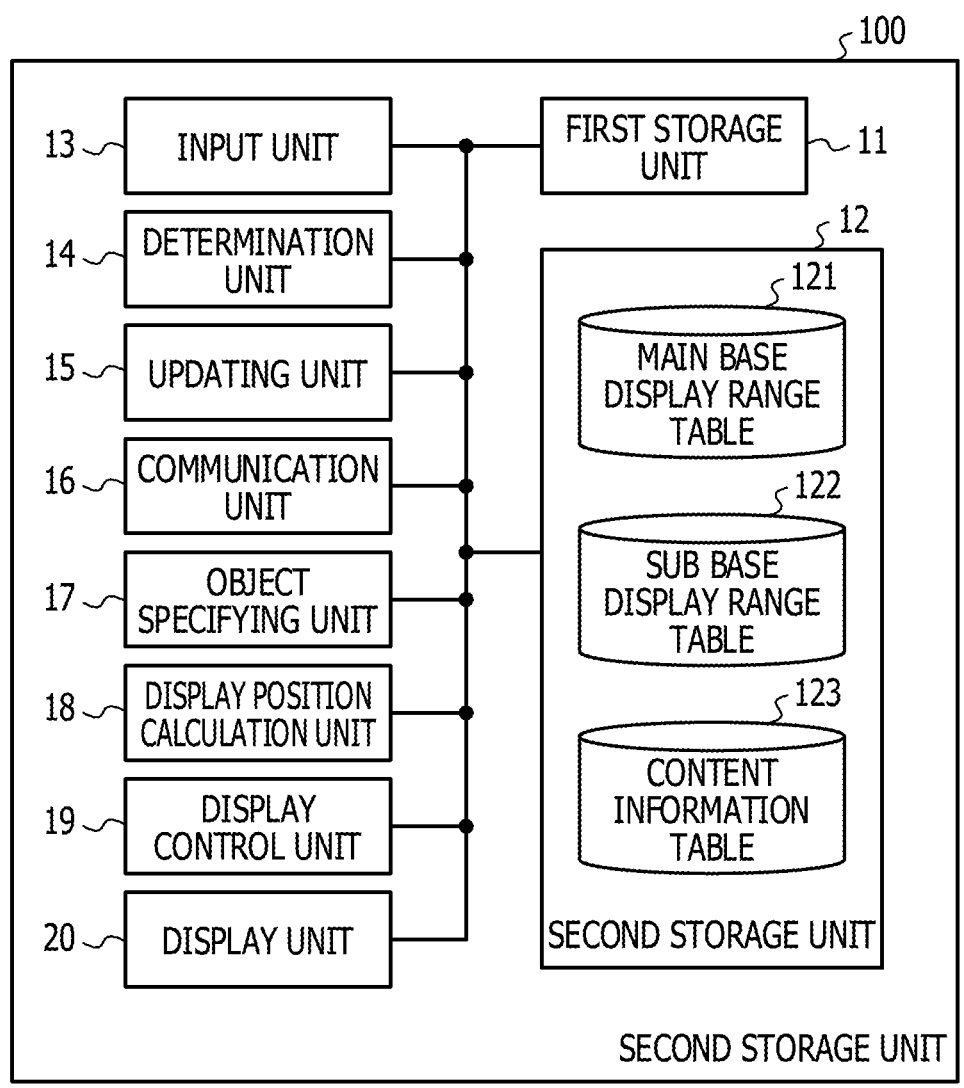
FIG. 4 is a diagram illustrating an example of a functional block of an information processing apparatus according to the first embodiment.

FIG. 4 is a diagram illustrating an example of the functional blocks of the information processing apparatus according to the first embodiment. Each of the information processing apparatuses 100 configuring the system 1 includes a first storage unit 11, a second storage unit 12, an input unit 13, a determination unit 14, an updating unit 15, a communication unit 16, an object specifying unit 17, a display position calculation unit 18, a display control unit 19, and a display unit 20. Function of each unit will be described below.

The first storage unit 11 stores a program executed by the information processing apparatus 100.

The second storage unit 12 stores information used for processing performed by the information processing apparatus 100. The second storage unit 12 stores, for example, a main base display range table 121, a sub base display range table 122, and a content information table 123. The main base display range table 121 stores information indicating a display range of the content displayed on the screen 21 of the information processing apparatus 100 at a main base. The screen 21 of the information processing apparatus 100 at the main base is an example of a first screen. The sub base display range table 122 stores information indicating a display range of the content displayed on the screen 21 of the information processing apparatus 100 at the sub base. The screen 21 of the information processing apparatus 100 at the sub base is an example of a second screen. The content information table 123 stores information on the plurality of objects 24 included in the content 22. Details of the main base display range table 121, the sub base display range table 122, and the content information table 123 will be described below.

The input unit 13 receives various inputs of an operation on the screen 21 performed by a user. This operation includes, for example, a scroll operation of the screen 21, a zoom operation to change magnification of the screen 21, an operation to newly generate the object 24, a movement operation of the object 24, an operation to erase the object 24, an operation to rotate the object 24, an operation to change the content or size of the object 24, and the like. Hereinafter, various operations relating to the object 24 except for the scroll operation and the zoom operation may be referred to as an object operation.

The determination unit 14 performs various types of determination processing performed by the information processing apparatus 100.

The updating unit 15 updates the main base display range table 121 according to the content of the operation that is made by a user and the input unit 13 receives.

The communication unit 16 communicates with the information processing apparatuses 100 installed at sub bases. For example, in a case where the main base display range table 121 or the content information table 123 included in the information processing apparatus 100 at the main base is updated, the communication unit 16 transmits the updated information to the information processing apparatuses 100 at the sub bases, on the main base side. In a case where the main base display range table 121 or the content information table 123 included in the information processing apparatus 100 at the sub base is updated, the communication unit 16 receives the updated information from the information processing apparatus 100 at the sub base, on the sub base side. By the communication of information performed by the communication unit 16, the respective information processing apparatuses 100 configuring the system 1 can grasp the content of the operation on the screen 21 performed at the sub bases.

The object specifying unit 17 specifies the object 24 that is displayed on the screen 21 of the information processing apparatus 100 at the sub base, but is not displayed on the screen 21 of the own device, among the plurality of objects 24 included in the content 22.

When displaying a mark corresponding to the object 24 specified by the object specifying unit 17 on the screen 21, the display position calculation unit 18 calculates the display position of the mark. Here, the mark is an image indicating the position where the object 24 which is not displayed on the screen 21 exists. Details of the mark will be described below.

The display control unit 19 performs display control for displaying an image such as the content 22 or a mark on the screen 21. The display control unit 19 can appropriately change a display range by performing processing of enlarging, reducing or rotating the display range.

The display unit 20 includes the screen 21 and displays an image on the screen 21 under the control of the display control unit 19.

Next, a hardware configuration of each of the information processing apparatuses 100 configuring the system 1 will be described.

Figure 5:
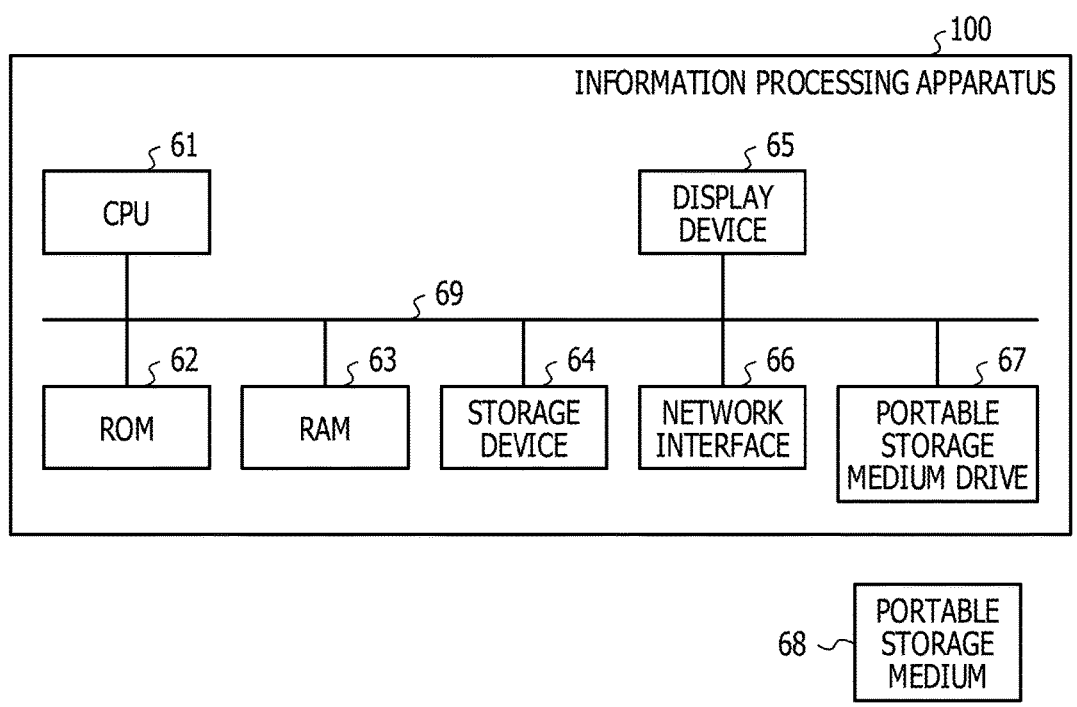
FIG. 5 is a diagram illustrating an example of a hardware configuration of the information processing apparatus according to the first embodiment.

FIG. 5 is a diagram illustrating an example of the hardware configuration of the information processing apparatus according to the first embodiment. As illustrated in FIG. 5, the information processing apparatus 100 includes a central processing unit (CPU) 61, a read only memory (ROM) 62, a random access memory (RAM) 63, a storage device 64, a display device 65, a network interface 66, a portable storage medium drive 67, and the like.

The CPU 61 is hardware for managing or performing processing of the information processing apparatus 100 and is an example of a processor. Another processing circuit such as a micro processing unit (MPU) or a digital signal processor (DSP) may be used as a processor. The CPU 61 is an example of the determination unit 14, the updating unit 15, the object specifying unit 17, the display position calculation unit 18, and the display control unit 19 illustrated in FIG. 4.

The ROM 62, the RAM 63, and the storage device 64 are hardware that stores data and a program used for processing performed by the CPU 61. The storage device 64 is, for example, a hard disk drive (HDD). The ROM 62 and the storage device 64 are an example of the first storage unit 11 illustrated in FIG. 4. The RAM 63 and the storage device 64 are an example of the second storage unit 12 illustrated in FIG. 4.

The display device 65 displays an image and may be referred to as a display device. The display device 65 is realized by a two-dimensional display device such as a liquid crystal display, a plasma display or an organic electroluminescence (EL) display, or a three-dimensional display device capable of performing stereoscopic display. The display device 65 is an example of the display unit 20 illustrated in FIG. 4.

The network interface 66 is hardware for communicating with other devices via the network 30. The network interface 66 is an example of the communication unit 16 illustrated in FIG. 4.

Each unit configuring the information processing apparatus 100 is connected to the bus 69 so as to be able to perform data communication with each other via the bus 69. In the information processing apparatus 100, a processor such as the CPU 61 executes a program stored in the ROM 62 or the storage device 64, or a program read from the portable storage medium 68 by the portable storage medium drive 67, and thereby a function of the information processing apparatus 100 is performed. The program may be installed in the RAM 63 and executed by a processor such as the CPU 61.

Next, processing performed by each of the information processing apparatuses 100 configuring the system 1 according to the first embodiment will be described.

In Case where Object Operation is Performed at Other Position

In an electronic conference, participants at each base may perform an object operation in the content 22 shared among the bases, using the information processing apparatus 100 that the participant has. Hereinafter, processing performed by the information processing apparatus 100 at the main base will be described in a case where an operation is performed for any one of the plurality of objects 24 in the content 22 at sub base.

Figure 6:
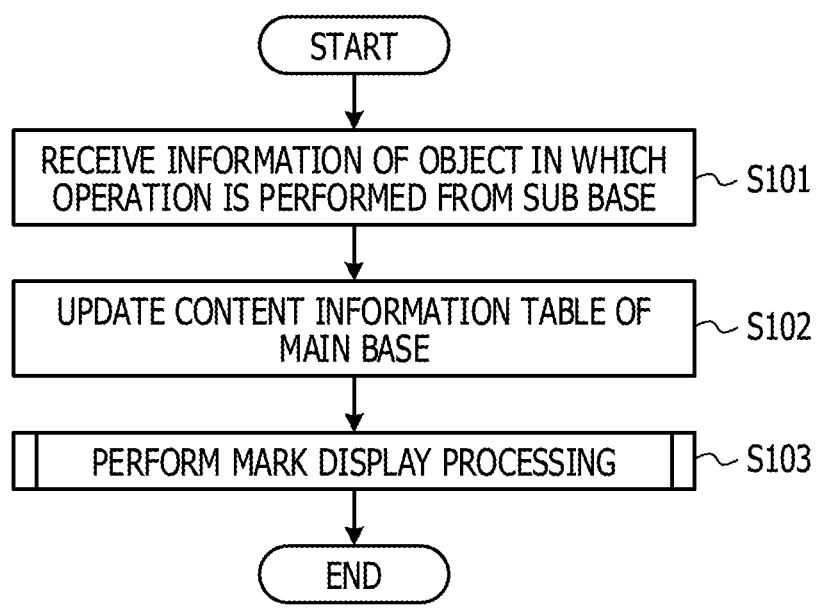
FIG. 6 is a flowchart illustrating an example of processing performed by the information processing apparatus at a main base in a case where an operation for an object is performed at a sub base, according to the first embodiment.

FIG. 6 is a flowchart illustrating an example of the processing performed by the information processing apparatus at the main base in a case where the object operation is performed at sub base, according to the first embodiment.

First, when the display unit 20 displays the content 22 on the screen 21, the communication unit 16 receives information on the object whose object operation is previously performed from the sub base (S101). In S101, in a case where any one of the objects 24 in the content 22 is updated at the sub base, the communication unit 16 receives an object name, position information, an operation type, and information correlated with date and time when the operation is completed from the information processing apparatus 100 at the sub base as information of the object 24 in which the operation is performed.

The position information indicates a position of the object 24, and is, for example, upper left coordinates and lower right coordinates of a region of the object 24. In a case where the region of the object 24 is a rectangle, the coordinates of one vertex among the four vertexes configuring the rectangle and lengths of sides starting from the vertex and extending in two directions can also be set as the position information. Alternatively, in a case where the region of the object 24 is a rectangle rotated by a predetermined angle, the coordinates of one vertex among the four vertexes configuring the rectangle and the length of the sides starting from the vertex and extending in two directions, and a rotation angle can be used as the position information.

The operation type is information indicating the type of object operation performed by a user of the information processing apparatus 100 at the sub base with respect to the object 24. The object name can be replaced with other information that can specify the object 24, such as an identifier.

Subsequently, the updating unit 15 updates the content information table 123 stored in the second storage unit 12 of the information processing apparatus 100 at the main base, based on the information received in S101 (S102). Here, the content information table 123 will be described.

FIG. 7 is a diagram illustrating an example of the content information table. The content information table 123 is shared at each base during the electronic conference. As illustrated in FIG. 7, the content information table 123 includes items of an object name, position information, an operation type, operated date and time, and a flag, and stores a plurality of entries for each object 24.

The item of position information includes sub items of upper left coordinates and lower right coordinates of the displayed region. For example, according to FIG. 7, it is confirmed that an object having an object name "e" is disposed at a position defined by the upper left coordinates (e1, e2) and the lower right coordinates (e3, e4).

The item of operation type is an item in which the type of operation is stored. The item of operated date and time is an item in which date and time when the operation is completed is stored. For example, according to FIG. 7, it is confirmed that an object having an object name "e" is generated by the main base or the sub base.

The item of flag is an item in which a flag indicating whether or not the flag is a candidate for displaying a mark on the screen 21 is stored. The item of flag indicates whether or not the condition which is displayed on the screen 21 of the sub base and which is not displayed on the screen 21 at the main base is satisfied. Accordingly, the information stored in the item of flag differs from each other for each base. According to the example of FIG. 7, it is confirmed that the object having the object name "e" satisfies the condition that is displayed on the screen 21 of the sub base and is not displayed on the screen 21 at the main base.

Returning to FIG. 6, information such as "generation", "movement", "change", "erasure", "rotation", and the like is stored in a column corresponding to the object 24 in which the sub base is updated, in the item of operation type of the content information table 123, by the updating processing of S102. By exchanging information relating to the operation of the object 24 between the bases, information stored in the items of the object name, the position information, and the operation type in the content information table 123 of the main base is the same as the information stored in the item corresponding to the item in the content information table 123 retained in the sub base.

Subsequently, the information processing apparatus 100 performs mark display processing in accordance with the updating of the content information table 123 (S103). Here, the mark display processing will be described.

Figure 8:
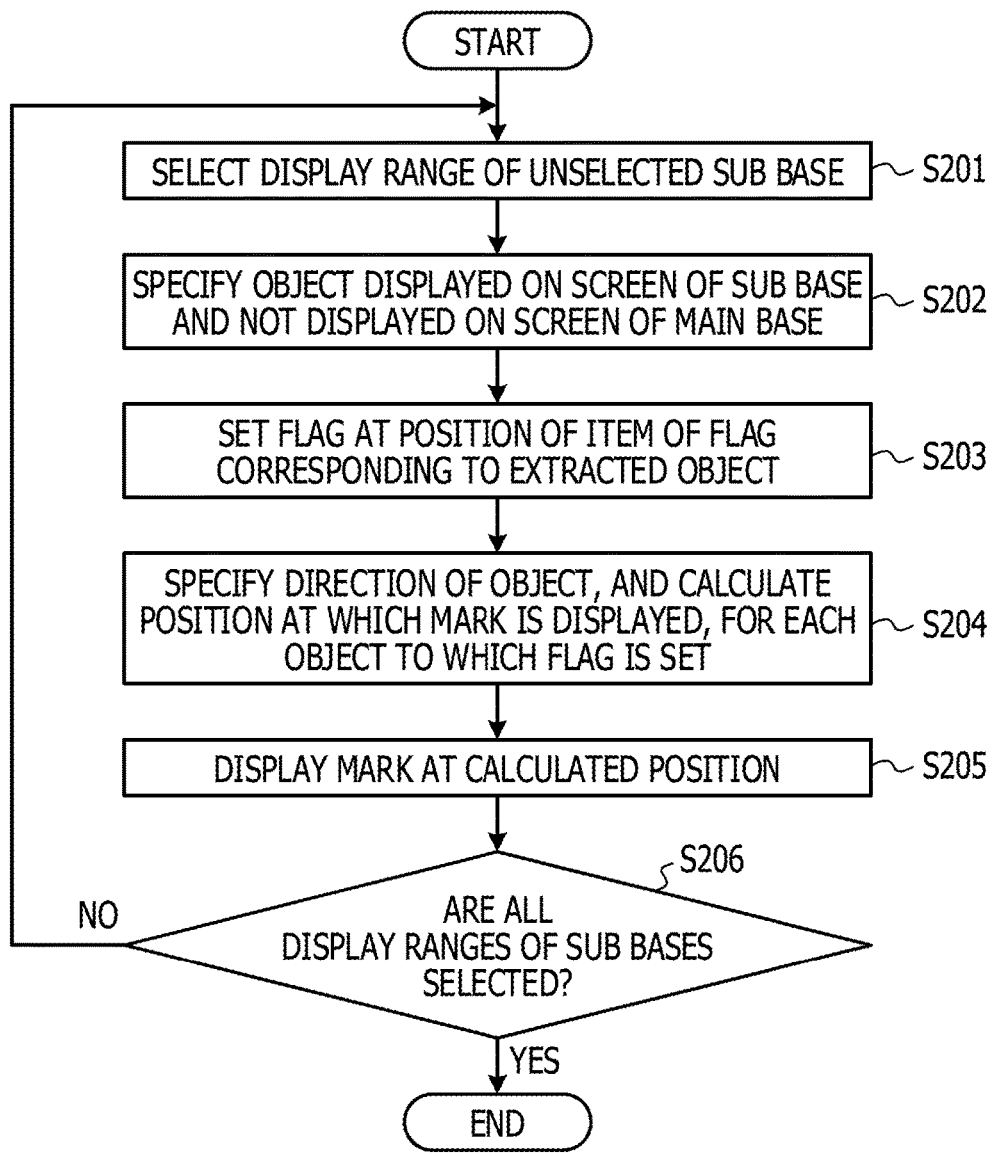
FIG. 8 is a flowchart illustrating an example of mark display processing according to the first embodiment.

FIG. 8 is a flowchart illustrating an example of the mark display processing according to the first embodiment.

First, the object specifying unit 17 selects a display range of the unselected sub base from among the display ranges of the sub base registered in the sub base display range table 122 stored in the second storage unit 12 (S201). Subsequently, the object specifying unit 17 specifies an object which is displayed on the screen 21 of the sub base and which is not displayed on the screen 21 at the main base from among the plurality of objects 24 stored in the content information table 123 by referring to the main base display range table 121 in which a display range of the main base is registered, and a display range of the sub base selected in S201 (S202). Here, the main base display range table 121 and the sub base display range table 122 will be described.

FIG. 9 is a diagram illustrating an example of the main base display range table. Information of a display range (first display range) indicating a range displayed on the screen 21 of the information processing apparatus 100 at the main base is stored in the main base display range table 121, in a region of the content. As illustrated in FIG. 9, the main base display range table 121 includes items of a display range and information on updated date and time. The item of display range includes upper left coordinates and lower right coordinates of a region to be displayed. The item of updated date and time indicates the date and time when an operation to change the display range is performed at the main base. For example, "2017/2/14, 9:00" indicates that information of the display range is updated at 9:00 AM on Feb. 14, 2017. The main base display range table 121 is updated by the updating unit 15 each time the display range is changed by an operation such as scrolling or zooming on the screen 21 at the main base.

FIG. 10 is a diagram illustrating an example of the sub base display range table. One piece or a plurality of pieces of information of a display range (second display range) indicating a range displayed on the screen 21 of the information processing apparatus 100 of the sub base is registered in the sub base display range table 122, in a region of the content. As illustrated in FIG. 10, the sub base display range table 122 includes items of a base name for identifying the base, a display range, and information of updated date and time. FIG. 10 illustrates an example in a case where the information processing apparatus 100 holding the sub base display range table 122 is installed at the base A in FIG. 1 and the sub bases are the base B and the base C. In the same manner as in the main base display range table 121, the item of the display range includes upper left coordinates and lower right coordinates of a region to be displayed. The item of the updated date and time indicates the date and time when the operation to change the display range is previously performed. The sub base display range table 122 is updated by the updating unit 15 each time information of the latest display range is received from the sub base.

Returning to FIG. 8, in S202, filtering is performed for the plurality of objects 24 stored in the content information table 123, using the information of the first display range of the main base and the information of the second display range of the sub base, and thereby, one or a plurality of objects 24 which are displayed on the screen 21 of the sub base and which are not displayed on the screen 21 at the main base are specified from among the plurality of objects 24. Here, the fact that the object is not displayed on the screen 21 at the main base indicates that all the objects are included in a region outside the screen 21 at the main base and all the objects do not appear on the screen 21 at the main base. Even in a case where the information of the object received in S101 indicates that erasing the object is previously performed, and in a case where the erased position is not displayed on the screen 21 at the main base, the erased object is included in the object to be specified in S202.

Subsequently, the object specifying unit 17 sets a flag at a position of the item of flag corresponding to the extracted object 24 in the content information table 123 (S203). In the example of FIG. 7, a flag "1" is set at a position of the item of flag corresponding to each object which is displayed on the screen 21 of the sub base and is not displayed on the screen 21 at the main base. Meanwhile, a flag "0" is set for an object which does not satisfy a condition that is displayed on the screen 21 of the sub base and that is not displayed on the screen 21 at the main base.

Subsequently, the display position calculation unit 18 specifies a direction of the object for each of the objects in which the flag is set to "1", and calculates a position at which the mark is displayed (S204). Specifically, for example, the display position calculation unit 18 calculates coordinates of the center of the object 24 for each of the objects 24 in which flags are set to "1", by using position information of the object stored in the content information table 123. Then, the display position calculation unit 18 specifies an intersection point between a straight line connecting the center of the screen 21 to coordinates of the center of the calculated object, and a contour line of the display range. The intersection point indicates a direction of the object 24 based on the center of the screen 21. Then, a position spaced apart from the specified intersection point by a predetermined distance in a central direction of the screen 21 is determined as the position at which the mark is displayed. As described above, processing of S204 is performed.

Subsequently, the display control unit 19 displays a mark at the position calculated in S204 (S205). In S205, the display control unit 19 specifies setting content of a corresponding operation type for each of the objects 24 in which flags are set to "1" by referring to the content information table 123. Then, the display control unit 19 displays a mark indicating that an operation is not performed for the object in which an operation type is not set, that is, an operation is not performed, at the position calculated in S204. Meanwhile, for the object in which the operation type is set, a mark of a type corresponding to the operation type is displayed at the position calculated in S204. The mark to be displayed is, for example, an image indicating a direction vector of the object based on the center of the screen 21, and can use an image having, for example, a wedge shape (triangle) or an arrow shape. When the mark is displayed, it is also possible to display marks of different colors such that setting or non-setting of the operation type can be visually recognized or can be visually recognized for each operation type.

Figure 11:
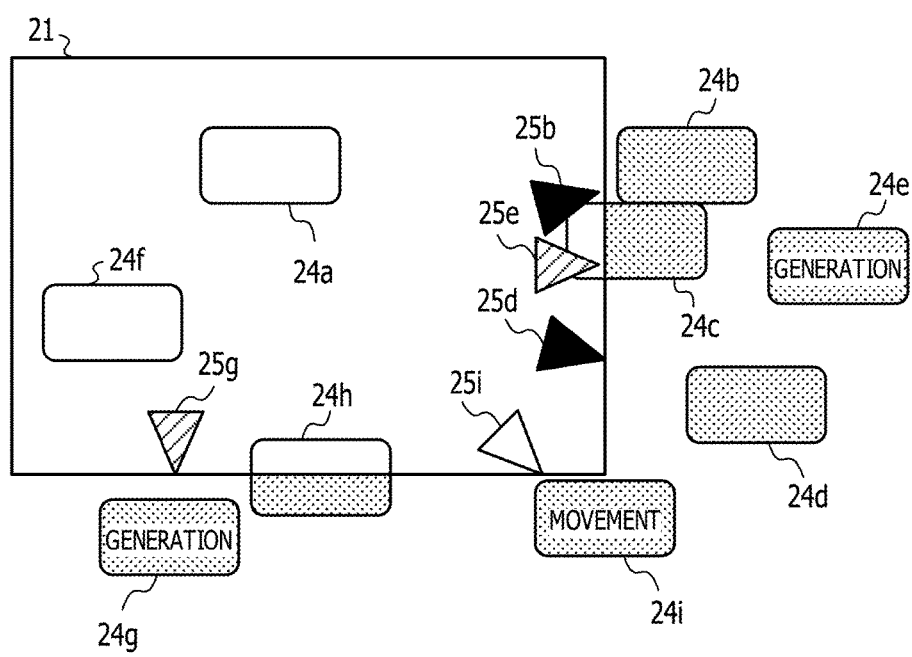
FIG. 11 is a diagram illustrating an example of a screen on which marks are displayed, according to the first embodiment.

FIG. 11 is a diagram illustrating an example of a screen on which marks are displayed, according to the first embodiment. In FIG. 11, for the sake of convenient description, the operation type is attached to the object in which the object operation is performed. As illustrated in FIG. 11, wedge-shaped marks 25*b*, 25*d*, 25*e*, 25*g*, and 25*i* are displayed on the screen 21, and objects 24*b*, 24*d*, 24*e*, and 24*g* not displayed on the screen 21, existence of 24*i*, and the operation type are displayed on the screen 21. The mark 25*i* corresponding to the object 24*i* in which an operation of moving is performed is displayed in white. The marks 25*e* and 25*g* corresponding to the objects 24*e* and 24*g* in which an operation creation is performed are displayed in a state where hatching of slant lines is performed. The marks 25*b* and 25*d* corresponding to the objects 24*b* and 24*d* in which the operation is not performed are displayed in black. Hereinafter, in a case where the marks are not distinguished from each other, the mark 25 may be collectively used.

According to the display method described above, a user can easily recognize a state of the object 24 not displayed on the screen 21, from a color or a pattern of the displayed arrow. As another display method, a distance from the center of the screen 21 to the object 24 is classified into one of a plurality of preset stages (for example, three stages), and a length or a color of the arrow can be changed according to the stage and can be displayed. According to the method, a user can easily recognize a positional relationship between the screen 21 and the non-displayed object from the length or the color of the displayed arrow.

Subsequently, the determination unit 14 determines whether or not the display ranges of the sub bases are all selected (S206). In a case where the determination unit 14 determines that all the display ranges of sub bases are not selected (S206: No), the processing returns to S201, and the processing after S201 is performed again. Meanwhile, in a case where the determination unit 14 determines that all the display ranges of the sub bases are selected (S206: Yes), a series of processing for displaying the mark 25 ends.

As described above, the processing is performed by the information processing apparatus 100.

As such, by displaying the mark 25 indicating existence of the object 24 on the screen 21, existence of the object 24 that is not displayed on the screen 21 can be recognized.

Furthermore, by displaying a type of the mark 25 according to the operation type, the content of the operation can be grasped which is performed by the sub base and is performed for the object 24 not displayed on the screen 21 at the main base.

According to a method of specifying the object 24 which is displayed on the screen 21 of the sub base and is not displayed on the screen 21 at the main base from among the plurality of objects 24 stored in the content information table 123, the object 24 corresponding to the mark 25 is limited to the object 24 referenced at the sub base, and thus, it is possible to reduce a load of the display processing of the mark 25, in a range that does not disturb communication between the bases.

In Case where Display Range Information is Altered at Sub Base

Next, process performed by the information processing apparatus 100 at the main base in a case where the display range is altered at the sub base will be described.

Figure 12:
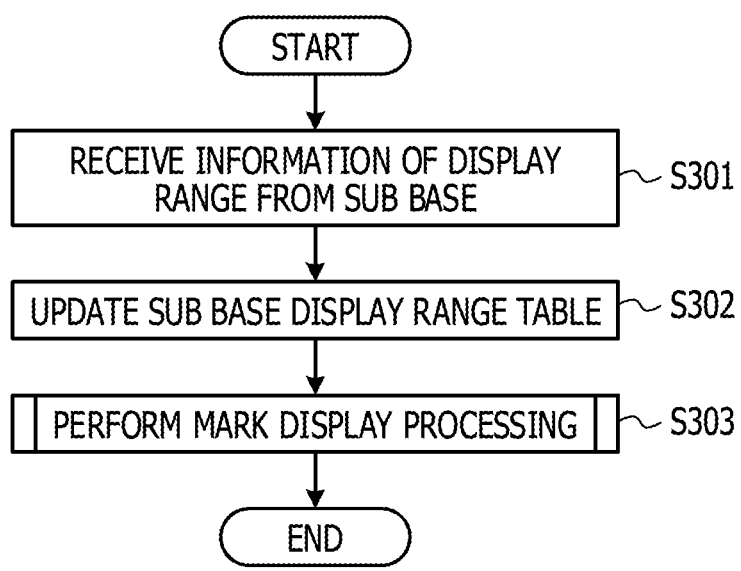
FIG. 12 is a flowchart illustrating an example of processing performed by the information processing apparatus at the main base in a case where a display range is altered at the sub base, according to the first embodiment.

FIG. 12 is a flowchart illustrating an example of the processing performed by the information processing apparatus at the main base in a case where the display range is altered at the sub base, according to the first embodiment.

First, when the display unit 20 displays the content 22 on the screen 21, the communication unit 16 receives information on the display range from the sub base (S301). In a case where the display range of the screen 21 of the information processing apparatus 100 of the sub base changes as a result of performing an operation such as scrolling or zooming at the sub base, the communication unit 16 receives information of the display range of the sub base updated by the operation from the information processing apparatus 100 at the sub base.

Subsequently, the updating unit 15 updates the sub base display range table 122 stored in the second storage unit 12, based on the information received in S301 (S302).

Subsequently, the information processing apparatus 100 performs display processing of the mark 25, according to the updating of the sub base display range table 122 (S303). The processing of S303 is the same as the processing of S103 illustrated in FIG. 6.

As described above, the processing is performed by the information processing apparatus 100.

Next, with an operation performed by a user for the information processing apparatus 100 at the main base as a momentum, processing performed in the system 1 will be described. Here, for the sake of simple description, it is assumed that there is one information processing apparatus 100 configuring the system 1 is at the sub base and a server storing the content 22 is connected between the main base and the sub base.

Figure 13:
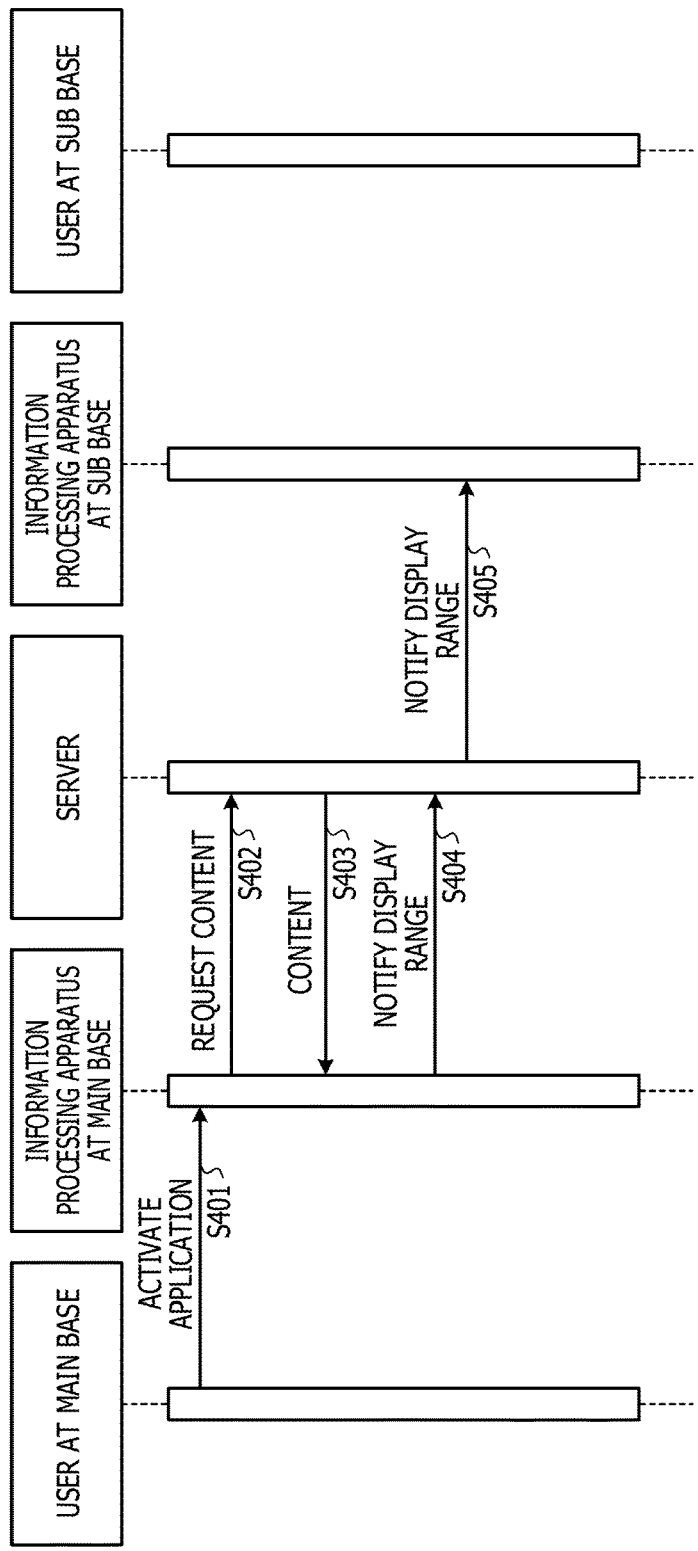
FIG. 13 is a sequence diagram illustrating an example of processing performed in the system in a case where an application is activated at the main base, according to the first embodiment.

FIG. 13 is a sequence diagram illustrating an example of processing performed in the system in a case where one application is activated at the main base, according to the first embodiment. In FIG. 13, a reference numeral "100" of the information processing apparatus is omitted so as to save a space.

First, a user at the main base performs a data input operation for activating an application for the information processing apparatus 100 at the main base (S401). The application in the information processing apparatus 100 at the main base is activated according to the operation. Then, the information processing apparatus 100 at the main base requests the content 22 to the server (S402). If receiving the request of the content 22, a server reads the content 22 from the storage device (not illustrated) included in the server and transmits the content to the information processing apparatus 100 at the main base (S403).

If receiving the content 22 from the server, the information processing apparatus 100 at the main base displays the content 22 on the screen 21. Then, the information processing apparatus 100 at the main base notifies the server of information of the display range at the time of displaying the content 22 (S404). The server notifies the information processing apparatus 100 at the sub base of the information on the received display range (S405).

As described above, processing is performed by the system 1.

In Case where Scroll Operation is Performed at Main Base

Next, processing performed by the information processing apparatus 100 in a case where a scroll operation is performed on the screen 21 of the information processing apparatus 100 at the main base will be described.

Figure 14:
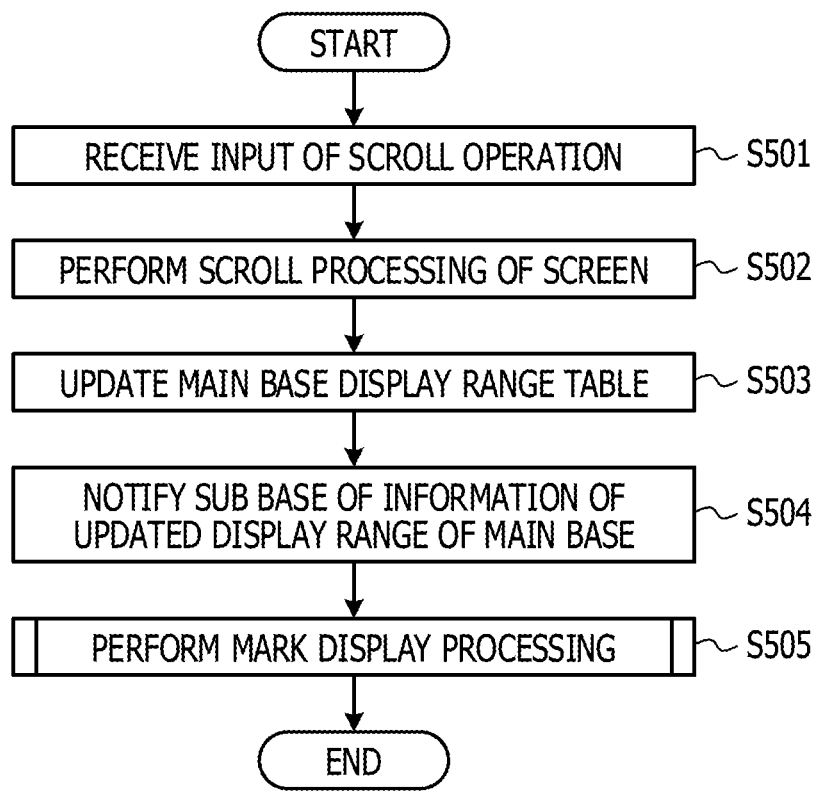
FIG. 14 is a flowchart illustrating an example of processing performed by the information processing apparatus in a case where a scroll operation is performed on a screen of the information processing apparatus at the main base, according to the first embodiment.

FIG. 14 is a flowchart illustrating an example of the processing performed by the information processing apparatus in a case where the scroll operation is performed on the screen 21 of the information processing apparatus at the main base, according to the first embodiment. FIG. 15 is a sequence diagram illustrating an example of the processing performed in the system in a case where the scroll operation is performed on the screen 21 of the information processing apparatus at the main base, according to the first embodiment. In FIG. 15, the reference numeral "100" of the information processing apparatus is also omitted in the same manner as in FIG. 13.

First, when the display unit 20 of the information processing apparatus 100 at the main base displays the content on the screen 21, the input unit 13 receives an input of the scroll operation on the screen 21 of the apparatus from a user at the main base, as illustrated in FIGS. 14 and 15 (S501). Thereafter, the display control unit 19 performs scroll processing of the screen 21, according to the input of the scroll operation as illustrated in FIG. 14 (S502). If the scroll processing is performed, a display range of the content 22 changes. Therefore, the updating unit 15 updates the main base display range table 121 stored in the second storage unit 12, according to the change of the display range (S503).

Subsequently, as illustrated in FIG. 14, the communication unit 16 notifies the sub base of the information of the updated display range of the main base (S504). In S504, for example, information of the updated display range of the main base is transmitted to the server as illustrated in FIG. 15 (S504a). Then, the server transfers the information of the received display range to the information processing apparatus 100 at the sub base (S504b). However, the information of the display range can also be transmitted directly from the information processing apparatus 100 at the main base to the information processing apparatus 100 at the sub base. By receiving the information of the updated display range, the information of the latest display range of the main base can be held.

Subsequently, as illustrated in FIG. 14, the information processing apparatus 100 at the main base performs display processing of the mark 25, according to a change in the display range of the main base (S505). The processing of S505 is the same as the processing of S103 illustrated in FIG. 6.

Figure 16A:
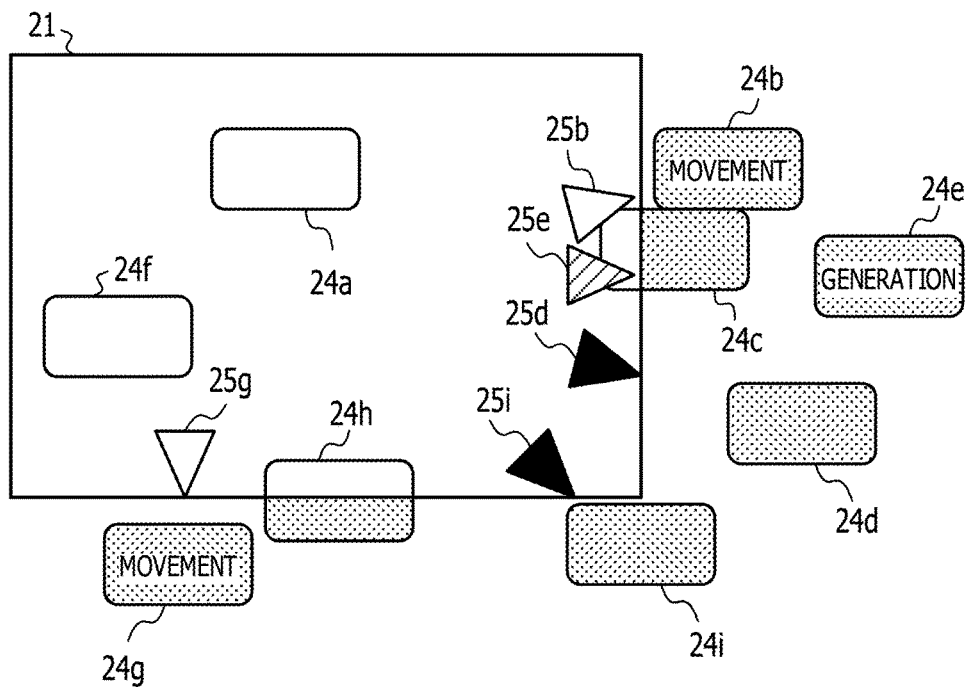
FIGS. 16A and 16B are diagrams illustrating an example of a screen change made by the scroll operation.
Figure 16B:
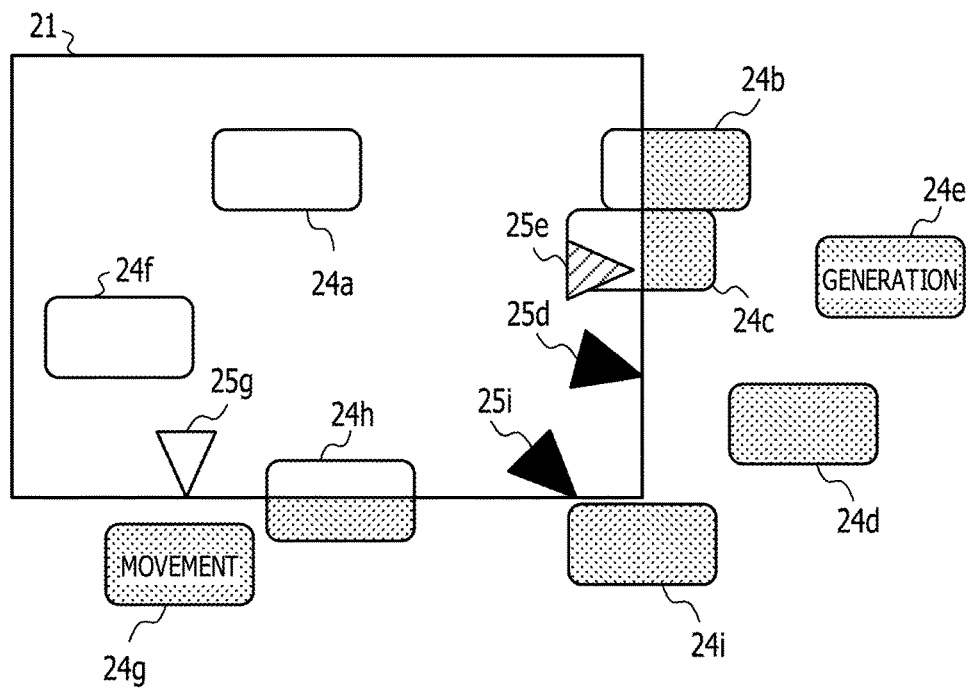

FIG. 16A and FIG. 16B are diagrams illustrating an example of a screen change made by the scroll operation. FIG. 16A illustrates a display state of the screen 21 before the scroll operation is performed. FIG. 16B illustrates a display state of the screen 21 updated in a case where the scroll operation is performed in the left direction on the screen 21. Further, in FIG. 16, a character "movement" is attached to the object 24 in which an operation of the movement is previously performed.

As illustrated in FIG. 16A, the marks 25 indicating positions where the respective objects 24 not displayed on the screen 21 exist are displayed on the screen 21 before the scroll operation is performed. Meanwhile, if the scroll operation is performed, a part of the object 24*b* not displayed on the screen 21 before the scroll operation is performed appears as illustrated in FIG. 16B through a series of processing illustrated in FIG. 14. According to this, the mark 25*b* corresponding to the object 24*b* that exists in FIG. 16A disappears. At this time, a flag corresponding to the object 24*b* in the content information table 123 changes from "1" to "0", and the information of "movement" stored in the item of the operation type in the content information table 123 is erased. As such, the content information table 123 is updated each time an operation is performed on the screen 21, and thereby, a display state of the mark 25 is updated on the screen 21. Thereby, it is possible to timely grasp a position where the object 24 which is not displayed on the screen 21 exists.

Figure 17A:
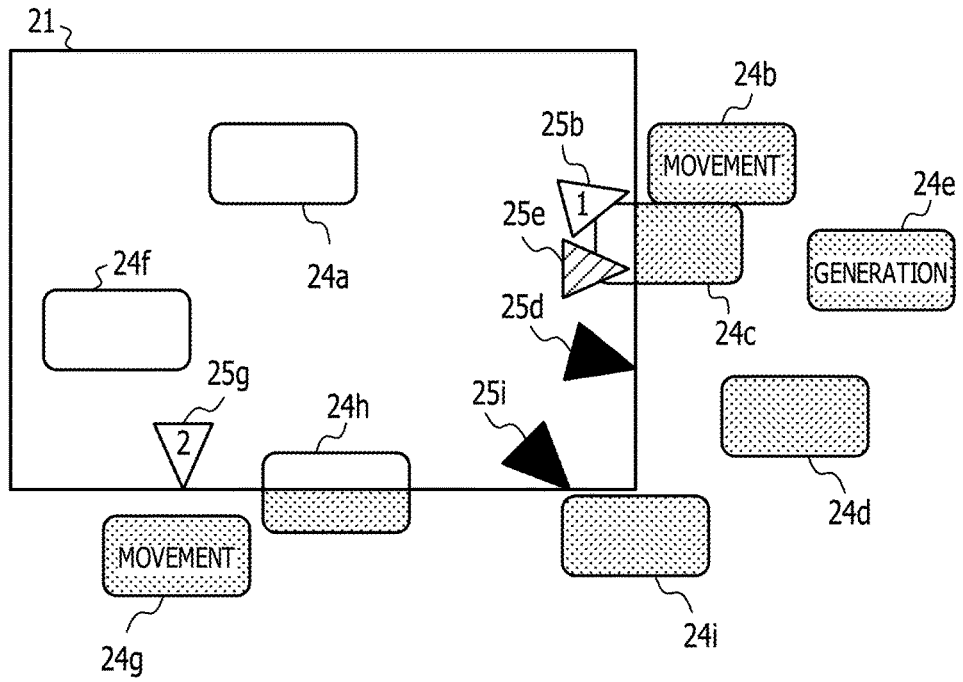
FIGS. 17A and 17B are diagrams illustrating another example of the screen change made by the scroll operation.
Figure 17B:
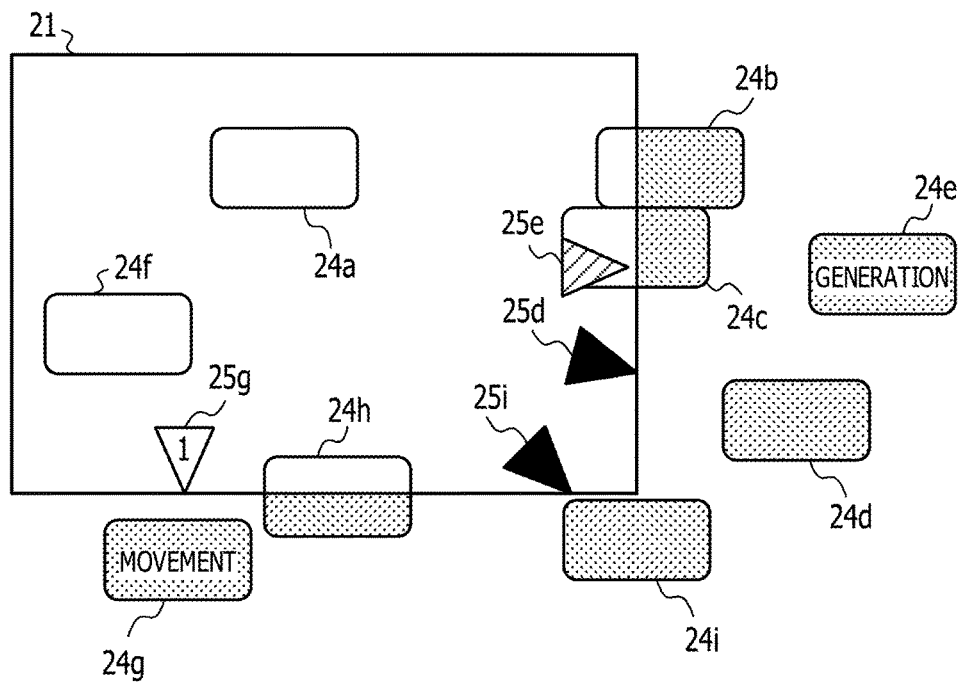

FIGS. 17A and 17B are diagrams illustrating another example of the screen change made by the scroll operation. FIG. 17A illustrates the display state of the screen 21 before the scroll operation is performed. FIG. 17B illustrates the display state of the screen 21 updated in a case where the scroll operation is performed on the screen 21 in the left direction. In the examples of FIGS. 17A and 17B, it is characterized that numerical values indicating the sequence in which the objects are generated are attached to the marks 25. In FIGS. 17A and 17B, the character "movement" is also attached to the object in which an operation of movement is previously performed for the sake of convenient description.

As illustrated in FIG. 17A, the marks 25 indicating positions where the respective objects not displayed on the screen 21 exist are displayed on the screen 21 before the scroll operation is performed. In the example of FIG. 17A, "1" is attached to the mark 25*b* corresponding to the object 24*b*, and "2" is attached to the mark 25*g* corresponding to the object 24*g*. The numerical values indicate a sequence in which the objects 24 are generated, and the sequence is determined based on the information stored in the item of operated date and time of the content information table 123. Thereby, a user can recognize the generation sequence of the objects 24 not displayed on the screen 21 by referring to the mark 25 displayed on the screen 21. Meanwhile, if the scroll operation is performed, a part of the object 24*b* that is not displayed on the screen 21 before the scroll operation is performed appears as illustrated in FIG. 17B. According to this, the mark 25*b* corresponding to the object 24*b* that exists in FIG. 17A disappears. At this time, a flag corresponding to the object 24*b* in the content information table 123 changes from "1" to "0", and the information of "movement" stored in the item of the operation type is erased. Furthermore, since "1" is attached to the mark 25*b* corresponding to the object 24*b*, the generation sequence of the object 24*g* moves up based on the updated information of the operated date and time, and a numerical value added to the mark 25*g* corresponding to the object 24*g* changes from "2" to "1". As such, the content information table 123 is updated each time an operation on the screen 21 is performed, and thereby, the display state of the mark 25 is updated. Thereby, it is possible to timely grasp the position where the object 24 not displayed on the screen 21 exists.

As described above, the processing is performed by the information processing apparatus 100 in a case where the scroll operation on the screen 21 is performed.

As such, by displaying the mark 25 indicating existence of the object 24, the existence of the object 24 not displayed on the screen 21 can be recognized. Furthermore, by displaying the type of mark 25 according to the operation type, the content of the operation which is performed at the sub base and is performed for the object 24 not displayed on the screen 21 at the main base can be grasp.

In Case where Zoom Operation is Performed at Main Base

Next, processing performed by the information processing apparatus 100 in a case where a zoom operation is performed on the screen 21 of the information processing apparatus 100 at the main base will be described. The zoom operation is processing of enlarging or reducing a range of a region displayed on the screen 21.

Figure 18:
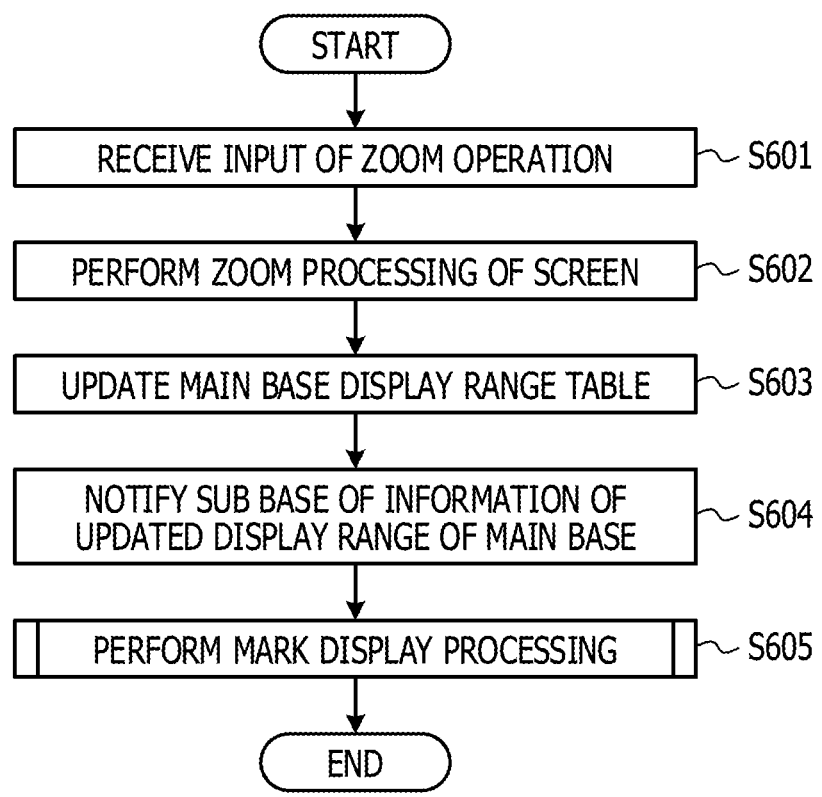
FIG. 18 is a flowchart illustrating an example of the processing performed by the information processing apparatus in a case where a zoom operation is performed on the screen of the information processing apparatus at the main base, according to the first embodiment.

FIG. 18 is a flowchart illustrating an example of processing performed by the information processing apparatus in a case where a zoom operation is performed on the screen of the information processing apparatus at the main base, according to the first embodiment.

First, when the display unit 20 of the information processing apparatus 100 at the main base displays the content 22 on the screen 21, the input unit 13 receives an input of the zoom operation on the screen 21 of the apparatus from a user at the main base (S601). Thereafter, the display control unit 19 performs zoom processing of the screen 21, according to the input of the zoom operation (S602). If the zoom processing is performed, a display range of the content changes. Therefore, the updating unit 15 updates the main base display range table 121 stored in the second storage unit 12, according to the change of the display range (S603). The processing of S603 is the same as the processing of S503 illustrated in FIG. 14.

Subsequently, the communication unit 16 notifies the sub base of the updated display range information of the main base (S604). The processing of S604 is the same as the processing of S504 illustrated in FIG. 14.

Subsequently, the information processing apparatus 100 performs display processing of the mark 25, according to the change of the display range (S605). The processing of S605 is the same as the processing of S505 illustrated in FIG. 14.

As described above, the processing is performed by the information processing apparatus 100 in a case where the zoom operation is performed on the screen 21.

In Case where Object Operation is Performed at Main Base

Next, processing performed by the information processing apparatus 100 in a case where an object operation is performed for the information processing apparatus 100 at the main base will be described.

Figure 19:
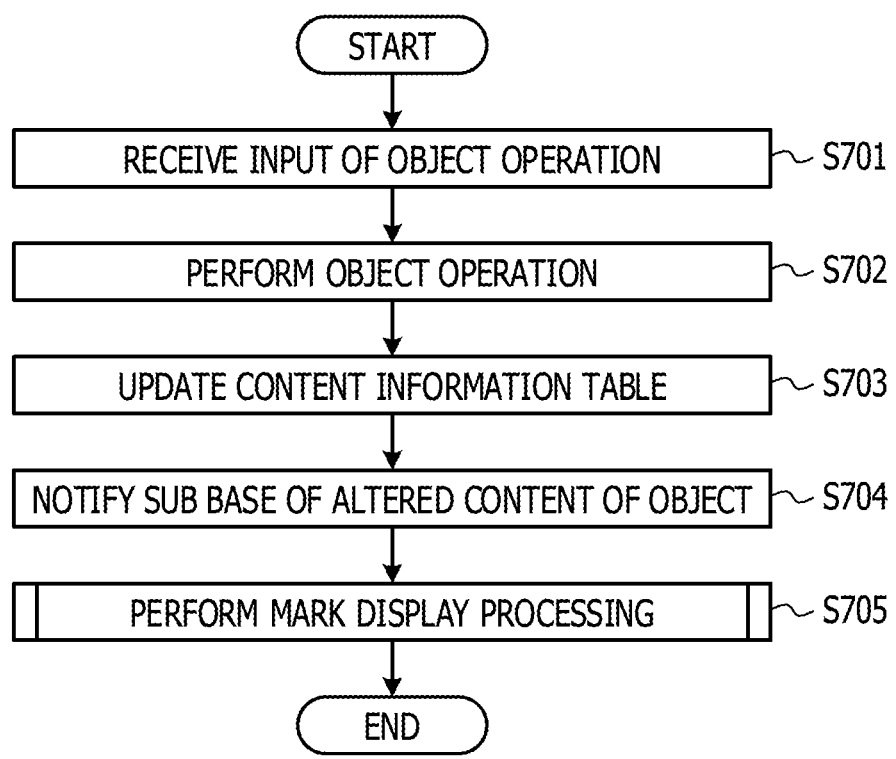
FIG. 19 is a flowchart illustrating an example of the processing performed by the information processing apparatus in a case where an operation to create, move, or erase an object is performed in the information processing apparatus at the main base, according to the first embodiment.

FIG. 19 is a flowchart illustrating an example of processing performed by the information processing apparatus in a case where an object operation is performed by the information processing apparatus at the main base, according to the first embodiment. The object 24 to be operated at the main base is an example of the second object.

Figure 20:
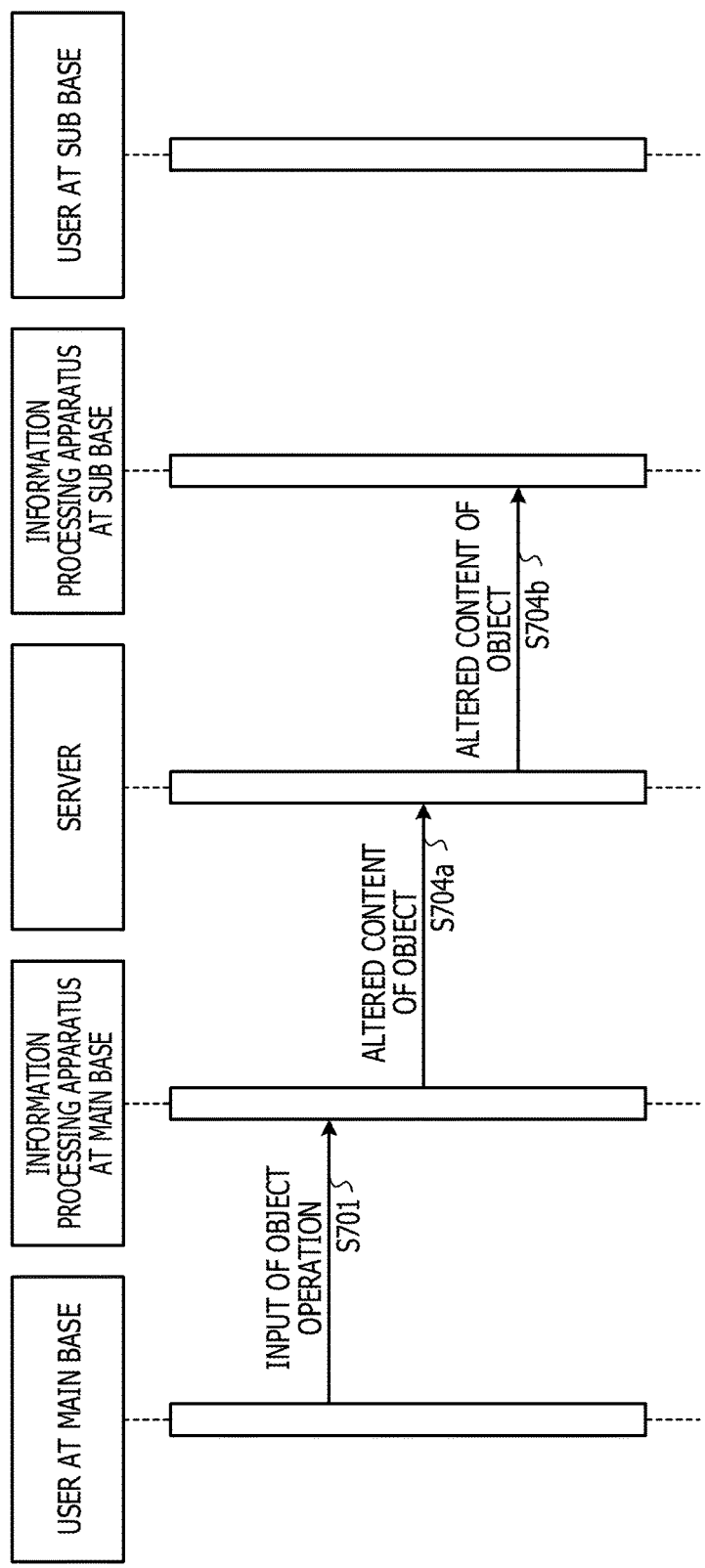
FIG. 20 is a sequence diagram illustrating an example of the processing performed in the system in a case where an object operation is performed by the information processing apparatus at the main base, according to the first embodiment.

FIG. 20 is a sequence diagram illustrating an example of processing performed in a system in a case where an object operation is performed by the information processing apparatus at the main base, according to the first embodiment. In FIG. 20, the reference numeral "100" of the information processing apparatus is also omitted in the same manner as in FIGS. 13 and 15.

First, as illustrated in FIGS. 19 and 20, when the display unit 20 of the information processing apparatus 100 at the main base displays the content on the screen 21, the input unit 13 receives an input of an object operation from a user at the main base (S701). Thereafter, the display control unit 19 performs the object operation, according to the content of the input (S702).

Subsequently, the updating unit 15 updates the content information table 123 stored in the second storage unit 12, according to the processing content of S702 (S703). In S703, in a case where the object 24 is generated in S702, the updating unit 15 stores an entry of a new object. Specifically, the updating unit 15 stores an entry in which an object name of the generated object 24, position information of the object, an operation type indicating "generation", and information of operated date and time are correlated with each other, in the content information table 123. Meanwhile, in a case where the object 24 is moved in S702, the updating unit 15 updates the existing entry stored in the content information table 123. Specifically, the updating unit 15 updates the position information and the operated date and time corresponding to the object name of the moved object 24, and sets information indicating "movement" to a column of the operation type. Meanwhile, the updating unit 15 also updates the existing entry stored in the content information table 123 even in a case where the object is erased in S702. Specifically, the updating unit 15 erases the position information corresponding to the object name of the erased object and updates the operated date and time. The updating unit 15 sets information indicating "erasure" to a column of the operation type corresponding to the object name of the erased object 24.

Subsequently, the communication unit 16 notifies the sub base of the altered content of the object 24 (S704). In S704, as illustrated in FIG. 20, for example, the altered content of the object 24 is transmitted to a server (S704a), and the server transfers the altered content of the received object 24 to the information processing apparatus 100 at the sub base (S704b). However, it is also possible to directly transmit the altered content of the object 24 from the information processing apparatus 100 at the main base to the information processing apparatus 100 at the sub base. Here, in a case where the object 24 is erased, as described above, the content information table 123 at the main base includes an entry in which information indicating "erasure" is set to the item of operation type. Accordingly, by referring to the altered content of the notified object 24, the information processing apparatus 100 at the sub base can easily recognize that the erased object 24 exists.

Subsequently, the information processing apparatus 100 at the main base performs display processing of the mark 25, according to the altered content of the object 24 (S705). The processing of S705 is the same as the processing of S505 illustrated in FIG. 14.

As described above, processing is performed by the information processing apparatus 100 at the main base.

According to the first embodiment, in the content 22 which is shared among the plurality of bases and includes the plurality of objects 24, a notification is received which indicates that an operation for the first object among the plurality of objects 24 is performed by the information processing apparatus 100 at the sub base, one object or a plurality of objects which are displayed on the second screen of the information processing apparatus 100 of the sub base and are not displayed on the first screen are specified from among the plurality of objects 24 in response to the notification, and in a case where the first object is included in one object or a plurality of objects, an image indicating existence of the first object and a type of operation are displayed at a position on the first screen which is calculated based on a position of the first object. According to this method, the mark 25 indicating existence of the object 24 not displayed on the screen 21 of the information processing apparatus 100 at the main base is displayed on the screen, and thus, it is possible to grasp content of the operation performed by the sub base in real time for the common content 22 used for an electronic conference.

Second Embodiment

Next, a second embodiment will be described. In the first embodiment, the contour line of the display range of the sub base is not displayed on the screen 21 of the information processing apparatus 100 at the main base. In contrast to this, in the second embodiment, it is characterized that the contour line of the display range of the sub base is overlapped and displayed on the screen 21 of the information processing apparatus 100 at the main base.

Hereinafter, the second embodiment will be described with reference to FIGS. 21 and 22. Also in the second embodiment, since the same system as the system 1 according to the first embodiment can be used, the description on the system will be omitted. The same reference numerals or symbols are attached to the same structure as in the first embodiment, and description thereof will be omitted.

In the second embodiment, in a case where an operation is performed for any one of a plurality of objects 24 in the content 22 at sub bases, the information processing apparatus 100 at the main base first performs the processing of S101 and S102 illustrated in FIG. 6. Meanwhile, in a case where the display range information is altered at the sub base, the information processing apparatus 100 at the main base first performs the processing of S301 and S302 illustrated in FIG. 12. Meanwhile, in a case where a scroll operation is performed on the screen 21 of the information processing apparatus 100 at the main base, the information processing apparatus 100 first performs the processing from S501 to S504 illustrated in FIG. 14. Meanwhile, in a case where a zoom operation is performed on the screen 21 of the information processing apparatus 100 at the main base, the information processing apparatus 100 first performs the processing from S601 to S604 illustrated in FIG. 18. If the processing of S102, S302, S504 or S604 is performed, the information processing apparatus 100 performs processing of overlapping and displaying a display range of the sub base on the screen 21 of the information processing apparatus 100 at the main base. Here, the processing of overlapping and displaying the display range of the sub base on the screen 21 of the information processing apparatus 100 at the main base will be described.

Figure 21:
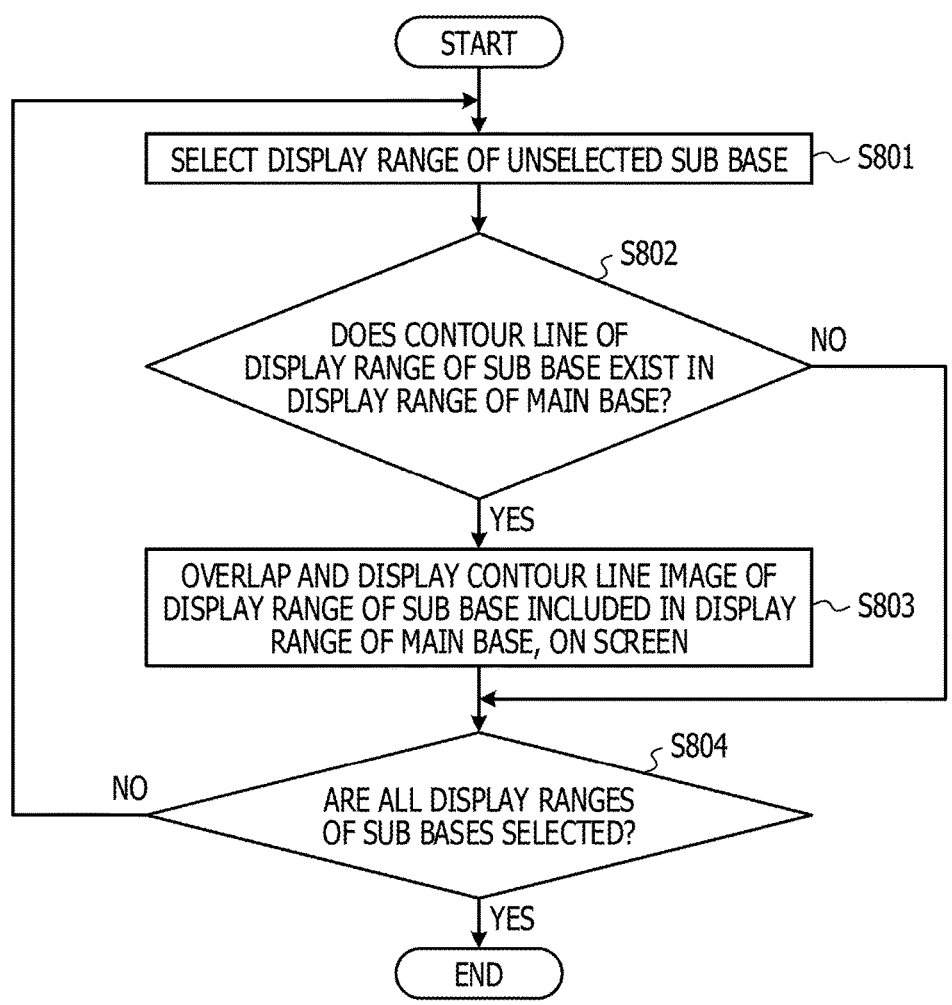
FIG. 21 is a flowchart illustrating an example of processing of overlapping and displaying the display range of the sub base on the screen of the information processing apparatus at the main base, according to a second embodiment.

FIG. 21 is a flowchart illustrating an example of the processing of overlapping and displaying the display range of the sub base on the screen of the information processing apparatus at the main base, according to a second embodiment.

First, the display control unit 19 selects a display range of an unselected sub base from among the display ranges of the sub bases registered in the sub base display range table 122 (S801).

Subsequently, the determination unit 14 determines whether or not a contour line of the display range of the sub base selected in S801 exists within the display range of the main base registered in the main base display range table 121 (S802). In a case where is determined that there is no contour line of the display range of the sub base within the display range of the main base (S802: No), the processing proceeds to S804. Meanwhile, in a case where it is determined that there is the contour line of the display range of the sub base within the display range of the main base (S802: Yes), the display control unit 19 overlaps and displays a contour line image, which exists within the display range of the main base, of the display range of the sub base, on the screen 21 (S803). It is preferable that the contour line image displayed in S803 is displayed by using different colors for each base such that which base the contour line image belongs to can be recognized. After the processing of S803, the processing proceeds to S804.

In S804, the determination unit 14 determines whether or not the display ranges of the sub bases are all selected. In a case where it is determined that all the display ranges of the sub bases are not selected (S804: No), the processing returns to S801, and the processing after S801 is performed again. Meanwhile, in a case where it is determined that all the display ranges of the sub bases are selected (S804: Yes), a series of processing for overlapping and displaying the display range of the sub base ends.

After the series of processing for overlapping and displaying the display range of the sub base ends, the information processing apparatus 100 performs display processing of the mark 25. The display processing of the mark 25 is the same as the processing of S103 illustrated in FIG. 6.

As described above, the processing is performed by the information processing apparatus 100.

Figure 22:
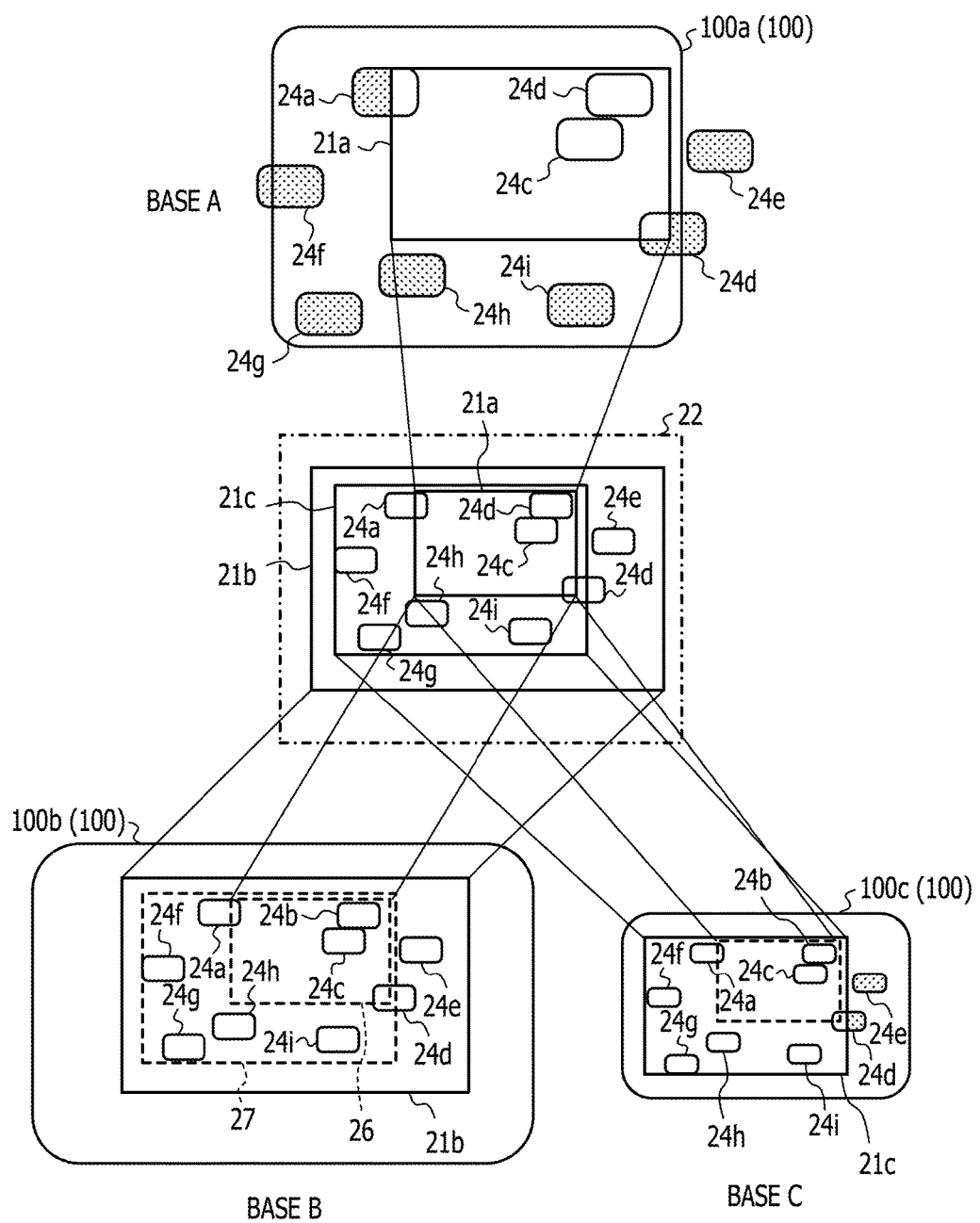
FIG. 22 is a diagram illustrating an example of a display state of content at each base.

FIG. 22 is a diagram illustrating an example of a display state of content at each base. Description on the same components as in FIG. 2, in FIG. 22 will be omitted.

As illustrated in FIG. 22, neither a contour line of a display range of the base B nor a contour line of a display range of the base C exists within the display range of the base A. Accordingly, contour line images of the display ranges of the bases B and C are not overlapped and displayed on the screen 21a of the information processing apparatus 100a at the base A, and only the objects 24a, 24b, 24c, and 24d are displayed.

Meanwhile, both the contour line of the display range of the base A and the contour line of the display range of the base C exist within the display range of the base B. Accordingly, the objects 24a, 24b, 24c, 24d, 24e, 24f, 24g, 24h, and 24i, a contour line image 26 of the display range of the base A, and a contour line image 27 of the display range of the base C are overlapped and displayed together on the screen 21b of the information processing apparatus 100b at the base B. In FIG. 22, a dashed line is used as a contour line image, but a solid line can also be used. Alternatively, the display ranges of the respective bases may be distinguished by using colors, or the display ranges of the respective bases may be indicated by graphics including contour lines instead of lines.

Meanwhile, the contour line of the display range of the base A exists within the display range of the base C, but the contour line of the display range of the base B does not exist. Accordingly, the contour line image 26 of the display range of the base A is overlapped and displayed on the screen 21c of the information processing apparatus 100c of the base C together with the objects 24a, 24b, 24c, 24d, 24f, 24g, 24h, and 24i.

According to the second embodiment, in a case where a contour line of a display range of the sub base exists within a display range of the main base, a contour line image of the display range of the sub base is overlapped and displayed on the screen 21 of the information processing apparatus 100 at the main base. According to this method, since the object 24 and the contour line image of the display range of the sub base are overlapped and displayed, a user of the information processing apparatus at the main base can grasp which object 24 is displayed at the sub base in real time. In an electronic conference, when an operation is performed for an object at the main base, the operation can be started while confirming whether or not the object is displayed at the sub base, and thus, it is possible to more smoothly hold the conference.

Third Embodiment

Next, a third embodiment will be described. In the second embodiment, processing of displaying the mark 25 of the object 24 which is displayed at the sub base but is not displayed at the main base is performed for each of all the sub bases. In contrast to this, the third embodiment is limited to a case where it is determined that a distance between a display range of a main base and a display range of the sub base is smaller than a predetermined threshold value, and is characterized in that processing of displaying the mark 25 corresponding to the object 24 relating to the sub base is performed.

In a case where the display range of the sub base is close to the display range of the main base, it can be regarded that an operation relating to an operation performed at the main base is also performed at the sub base. On the contrary, in a case where the display range of the sub base is not close to the display range of the main base, it can be regarded that the operation performed at the sub base is the operation not related to the main base, and it is possible to omit the display of the mark 25 corresponding to the object 24 operated by the sub base. The third embodiment utilizes this concept.

Hereinafter, the third embodiment will be described with reference to FIGS. 23 and 24. Also in the third embodiment, the same system as the system 1 according to the first embodiment can be used, and thus, description on the system will be omitted. The same reference numerals or symbols are attached to the same structure as in the first embodiment, and description thereof will be omitted.

In the third embodiment, in a case where an operation is performed for any one of a plurality of objects 24 in the content 22 at the sub base, the information processing apparatus 100 at the main base first performs the processing of S101 and S102 illustrated in FIG. 6. Meanwhile, in a case where display range information is altered at the sub base, the information processing apparatus 100 at the main base first performs the processing of S301 and S302 illustrated in FIG. 12. Meanwhile, in a case where a scroll operation is performed on the screen 21 of the information processing apparatus 100 at the main base, the information processing apparatus 100 first performs the processing from S501 to S504 illustrated in FIG. 14. Meanwhile, in a case where a zoom operation is performed on the screen 21 of the information processing apparatus 100 at the main base, the information processing apparatus 100 first performs the processing from S601 to S604 illustrated in FIG. 18. If the information processing apparatus 100 performs any of the processing of S102, S302, S504 or S604 according to the operation content, the information processing apparatus 100 performs the display processing of the mark 25. Here, the display processing of the mark 25 performed in the third embodiment will be described.

FIG. 23 is a flowchart illustrating an example of mark display processing, according to the third embodiment.

First, the display control unit 19 selects a display range of an unselected sub base from among display ranges of sub bases registered in the sub base display range table 122 (S901).

Subsequently, the determination unit 14 determines whether or not a distance between the display range of the main base registered in the main base display range table 121 and the display range of the sub base selected in S901 is smaller than a predetermined threshold value (S902).

Figure 24A:
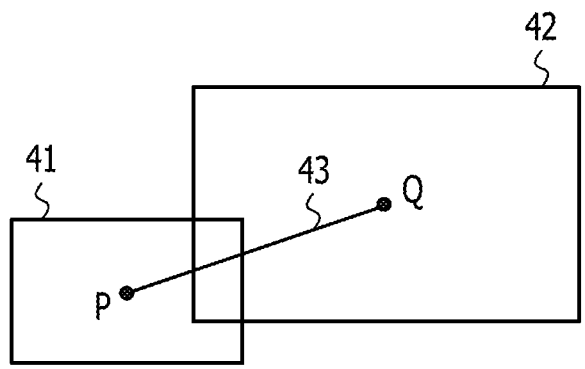
FIGS. 24A and 24B are diagrams illustrating an example of a distance between the display range of the main base and the display range of the sub base.
Figure 24B:
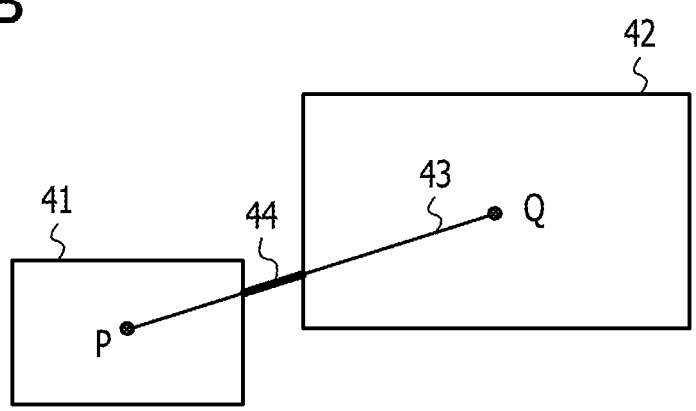

FIGS. 24A and 24B are diagrams illustrating an example of the distance between the display range of the main base and the display range of the sub base.

In S902, for example, as illustrated in FIG. 24A, a distance between a display range 41 of the main base and a display range 42 of the sub base is defined as a length of a line segment PQ43 having a center P of the display range 41 of the main base and a center Q of the display range 42 of the sub base as end points, and a method of determining whether or not the length is smaller than a predetermined threshold value can be used. According to the method, a comparison with a predetermined distance can be performed regardless of whether or not the display range 41 of the main base overlaps the display range 42 of the sub base.

Alternatively, in a case where the display range 41 of the main base does not overlap the display range 42 of the sub base, as illustrated in FIG. 24B, at a position of the line segment PQ 43 having the center P of the display range 41 of the main base and the center Q of the display range 42 of the sub base as end points, a length of a gap 44 (part denoted by a bold line) between the display range 41 of the main base and the display range 42 of the sub base is defined as a distance, and a method of determining whether or not the length is smaller than a predetermined threshold can be used. According to this method, determination is made by using the gap, and thereby, whether or not the display range 41 of the main base and the display range 42 of the sub base are close to each other can be determined without being influenced by a magnitude of the display range.

Returning to FIG. 23, in S902, in a case where it is determined that the distance between the display range 41 of the main base and the display range 42 of the sub base is not smaller than a predetermined threshold value (S902: No), it is determined that display processing of the mark 25 is not performed by using information of the sub base, and the processing proceeds to S907. Meanwhile, in a case where it is determined that the distance between the display range 41 of the main base and the display range 42 of the sub base is smaller than the predetermined threshold value (S902: Yes), it is determined that the display processing of the mark 25 is performed by using the information of the sub base. Then, by performing the processing from S903 to S906 illustrated in FIG. 23, processing of displaying the mark 25 of the object 24 which is displayed at the sub base but is not displayed at the main base is performed. The processing from S903 to S906 is the same as the processing from S202 to S205 illustrated in FIG. 8.

After the processing of S906, the determination unit 14 determines whether or not all the display ranges 42 of the sub bases are selected (S907). In a case where it is determined that all the display ranges 42 of the sub bases are not selected (S907: No), the processing returns to S901, and the processing after S901 are performed again. Meanwhile, in a case where it is determined that all the display ranges 42 of the sub bases are selected (S907: Yes), a series of processing for displaying the mark 25 ends.

As described above, the processing is performed by the information processing apparatus 100.

According to the third embodiment, it is determined whether or not the distance between the display range 41 of the main base and the display range 42 of the sub base is smaller than the predetermined threshold for each of the plurality of sub bases, and in a case where it is determined that the distance is smaller than the predetermined threshold value, the processing of displaying the mark 25 is performed. According to this method, it is possible to configure such that the mark 25 corresponding to the object 24 displayed at the sub base unrelated to the main base is not displayed, and thereby, it can be expected that the number of the marks 25 displayed on the screen 21 is reduced more than the number of marks in a case of the first embodiment, and it is possible for a user to improve visible recognition of the mark 25 on the screen 21.

As described above, the preferred embodiments of the present disclosure are described in detail, the present disclosure is not limited to the specific embodiments, and various modifications and changes can be made. For example, in the first to third embodiments, a rectangular region is exemplified as the display region, but the display region is not limited to the rectangular region, and it is also possible to use a shape other than a rectangular shape, such as a corner-rounded rectangle, a perfect circle or an ellipse.

In the first to third embodiments, the mark 25 is exemplified as an image indicating existence of the object 24 and a type of operation, but it is also possible to adopt a method of securing an inner rim periphery of an outline of the screen 21 as a notification region for indicating the existence of the object 24 not displayed to the user and of coloring and displaying a predetermined region corresponding to a display position in the notification region instead of displaying the mark 25 in the notification region. The mark 25 to be displayed can be blinked such that the user can easily recognize.

In the third embodiment, only in a case where it is determined that a distance between the display range 41 of the main base and the display range 42 of the sub base is smaller than a predetermined threshold is used, processing of displaying the mark 25 corresponding to the object 24 relating to the sub base is performed, but only a case where it is determined that the display range 42 of the sub base overlaps the display range 41 of the main base, processing of displaying the mark 25 may be performed.

A computer program for causing a computer to perform the above-described information processing apparatus and information processing method, and a non-transitory computer readable recording medium in which the program is recorded are included in the scope of the present disclosure. Here, the non-transitory computer readable recording medium is a memory card such as an SD memory card. The computer program is not limited to being recorded on the recording medium, and may be transmitted via an electric communication line, a wireless or wired communication line, a network 30 representative of the Internet, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a display; and
a processor coupled to the display, configured to:
in a case where a part of a plurality of objects included in contents to be shared by a plurality of information processing apparatuses is out of an area of a first screen of the display, receive a notification which indicates that an operation for a first object which is out of the area of the first screen is executed by another information processing apparatus, and
display an image which indicates existence of the first object and a type of the operation at a position on the first screen, the position being calculated based on a position of the first object.

2. The information processing apparatus according to claim 1, wherein, when a notification indicating that the first object is erased is received, the processor is configured to display the image indicating that the first object is erased at a position on the first screen which is calculated based on a position where the first object is erased.

3. The information processing apparatus according to claim 1, wherein the processor is configured to calculate a position to display the image, based on a positional relationship between the first object and a first display range indicating a range displayed on the first screen.

4. The information processing apparatus according to claim 1, wherein, in a case where the first object is displayed on the first screen as the first display range changes, the processor is configured to erase the image.

5. The information processing apparatus according to claim 1, wherein, in a case where the first display range alters, the processor is configured to transmit a notification indicating that the first display range is altered to the other information processing apparatus.

6. The information processing apparatus according to claim 5, wherein, in a case where an operation for a second object that is included in the content is performed through the first screen, the processor is configured to transmit a notification indicating that an operation for the second object is performed to the other information processing apparatus.

7. The information processing apparatus according to claim 1, wherein, in a case where there is a contour line of a second display range indicating a range that is displayed on a second screen of the other information processing apparatus within the first display range, the processor is configured to overlap and display a contour line image of the second display range on the first screen.

8. The information processing apparatus according to claim 7, wherein the processor is configured to determine whether or not a distance between the first display range and the second display range is smaller than a predetermined threshold value, for each of a plurality of sub bases, and in a case where it is determined that the distance is smaller than the predetermined threshold value, the processor performs processing of displaying the image.

9. The information processing apparatus according to claim 8, wherein the distance is a length of a line segment that connects a center of the first display range to a center of the second display range.

10. The information processing apparatus according to claim 8, wherein the distance is a gap between the first display range and the second display range, at a position of a line segment having a center of the first display range and a center of the second display range as end points.

11. An information processing method which is performed by a processor that is included in an information processing apparatus, the information processing method comprising:
in a case where a part of a plurality of objects included in contents to be shared by a plurality of information processing apparatuses is out of an area of a first screen of the display, receiving a notification which indicates that an operation for a first object which is out of the area of the first screen is executed by another information processing apparatus; and
displaying an image which indicates existence of the first object and a type of the operation at a position on the first screen, the position being calculated based on a position of the first object.

12. A non-transitory computer-readable storage medium having stored therein a program for displaying images, the program executes a process comprising:
in a case where a part of a plurality of objects included in contents to be shared by a plurality of information processing apparatuses is out of an area of a first screen of the display, receiving a notification which indicates that an operation for a first object which is out of the area of the first screen is executed by another information processing apparatus; and
displaying an image which indicates existence of the first object and a type of the operation at a position on the first screen, the position being calculated based on a position of the first object.

* * * * *